(12) United States Patent
Jones et al.

(10) Patent No.: US 6,910,158 B2
(45) Date of Patent: Jun. 21, 2005

(54) TEST TOOL AND METHODS FOR FACILITATING TESTING OF DUPLEXED COMPUTER FUNCTIONS

(75) Inventors: Steven B. Jones, Poughkeepsie, NY (US); Thomas C. Shaw, Poughkeepsie, NY (US); David A. Stilwell, Poughkeepsie, NY (US); Scott B. Tuttle, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 09/968,420

(22) Filed: Oct. 1, 2001

(65) Prior Publication Data

US 2003/0065977 A1 Apr. 3, 2003

(51) Int. Cl.$^7$ .............................................. G06F 11/00
(52) U.S. Cl. ........................................ 714/38; 714/31
(58) Field of Search ..................... 714/38, 11, 5, 714/33, 42, 47, 39, 31, 32; 709/212, 248, 227, 228, 201, 216, 108, 200, 223, 224; 711/112; 717/124

(56) References Cited

U.S. PATENT DOCUMENTS

| | | | |
|---|---|---|---|
| 4,569,017 A | 2/1986 | Renner et al. | 364/200 |
| 4,674,036 A | 6/1987 | Conforti | 364/200 |
| 5,065,397 A | 11/1991 | Shiobara | 370/85.5 |
| 5,271,000 A | 12/1993 | Engbersen et al. | 370/13 |
| 5,317,739 A | 5/1994 | Elko et al. | 395/650 |
| 5,331,673 A | 7/1994 | Elko et al. | 395/575 |
| 5,339,405 A | 8/1994 | Elko et al. | 395/575 |
| 5,339,427 A | 8/1994 | Elko et al. | 395/725 |
| 5,343,461 A | 8/1994 | Barton et al. | 370/13 |
| 5,371,883 A | * 12/1994 | Gross et al. | 714/38 |
| 5,392,397 A | 2/1995 | Elko et al. | 395/200 |
| 5,398,331 A | 3/1995 | Huang et al. | 395/575 |
| 5,434,975 A | 7/1995 | Allen | 395/200 |
| 5,450,590 A | 9/1995 | Elko et al. | 395/700 |

(Continued)

FOREIGN PATENT DOCUMENTS

| | | | |
|---|---|---|---|
| EP | 817095 | 1/1998 | G06F/13/40 |
| EP | 950954 | 10/1999 | G06F/11/14 |
| FR | 2404970 | 6/1979 | H04B/3/50 |
| JP | 62-185424 A | 8/1987 | H04J/3/12 |
| WO | WO9423367 | 10/1994 | G06F/11/14 |

OTHER PUBLICATIONS

Chalmtac et al., "Performance Models of Asynchronous Multitrunk HYPERchannel Networks," *IEEE Trans. on Computers*, vol. C–36, No. 2, pp. 138–146, Feb. 1987 (Abstract Only).

Thierer, M., "Reliability and Monitoring of Computer Controlled Arrangements,", Fernmelde–Praxis, vol. 51, No. 14, pp. 573–591, Jul. 24, 1991 (Abstract Only).

Elko et al., "Coupling Facility Serviceability–Event Notification of Link–Incident Records and Error Reporting", IBM Technical Disclosure Bulletin, vol. 30, No. 4, Apr. 95, p. 173–181.

*Primary Examiner*—Nadeem Iqbal
(74) *Attorney, Agent, or Firm*—Floyd A. Gonzalez, Esq.; Eugene Shkurko, Esq.; Heslin, Rothenberg, Farley & Mesiti, P.C.

(57) ABSTRACT

Test tool logic and testing methods are provided for facilitating testing a duplexed computer function, such as a duplexed coupling facility. The test tool allows a testcase written for a first environment to be automatically driven in a second environment, thereby facilitating testing of a function of the second environment. Other aspects include logic for intercepting a system event by a test tool to facilitate testing of system-managed event processing, and for adjusting a display characteristic of one or more messages to be displayed by the test tool based on message type. Further, logic for propagating an environmental error indication and for facilitating processing a wait state are also provided, as are several new test tool verbs and macros.

74 Claims, 27 Drawing Sheets

U.S. PATENT DOCUMENTS

| | | | |
|---|---|---|---|
| 5,457,793 A | 10/1995 | Elko et al. | 395/600 |
| 5,463,736 A | 10/1995 | Elko et al. | 395/848 |
| 5,465,359 A | 11/1995 | Allen et al. | 395/700 |
| 5,493,668 A | 2/1996 | Elko et al. | 395/457 |
| 5,515,499 A | 5/1996 | Allen et al. | 395/182.03 |
| 5,537,574 A | 7/1996 | Elko et al. | 395/468 |
| 5,561,809 A | 10/1996 | Elko et al. | 395/800 |
| 5,574,849 A | 11/1996 | Sonnier et al. | 395/182.1 |
| 5,574,945 A | 11/1996 | Elko et al. | 395/825 |
| 5,581,737 A | 12/1996 | Dahlen et al. | 395/497.01 |
| 5,604,863 A | 2/1997 | Allen et al. | 395/182.09 |
| 5,608,865 A | 3/1997 | Midgely et al. | 395/180 |
| 5,630,050 A | 5/1997 | Neuhard et al. | 395/183.03 |
| 5,634,072 A | 5/1997 | Allen et al. | 396/674 |
| 5,664,155 A | 9/1997 | Elko et al. | 711/170 |
| 5,689,689 A | 11/1997 | Meyers et al. | 395/553 |
| 5,692,122 A * | 11/1997 | Bird | 714/38 |
| 5,706,432 A | 1/1998 | Elko et al. | 395/200.08 |
| 5,712,856 A | 1/1998 | Finney et al. | 371/20.1 |
| 5,737,600 A | 4/1998 | Geiner et al. | 395/616 |
| 5,742,830 A | 4/1998 | Elko et al. | 395/728 |
| 5,751,955 A | 5/1998 | Sonnier et al. | 395/200.19 |
| 5,761,739 A | 6/1998 | Elko et al. | 711/171 |
| 5,790,776 A | 8/1998 | Sonnier et al. | 395/189.08 |
| 5,831,998 A * | 11/1998 | Ozmizrak | 714/741 |
| 5,860,115 A | 1/1999 | Neuhard et al. | 711/147 |
| 5,881,238 A | 3/1999 | Aman et al. | 395/200.56 |
| 5,887,135 A | 3/1999 | Dahlen et al. | 395/200.8 |
| 5,892,970 A | 4/1999 | Hagersten | 395/825 |
| 5,923,890 A | 7/1999 | Kubala et al. | 395/800.01 |
| 5,948,060 A | 9/1999 | Gregg et al. | 709/212 |
| 6,061,807 A | 5/2000 | Albert et al. | 714/3 |
| 6,080,203 A | 6/2000 | Njinda et al. | 716/4 |
| 6,158,031 A | 12/2000 | Mack et al. | 714/724 |
| 6,178,421 B1 | 1/2001 | Dahlen et al. | 707/8 |
| 6,230,243 B1 | 5/2001 | Elko et al. | 711/130 |
| 6,233,644 B1 | 5/2001 | Dahlen et al. | 710/200 |
| 6,408,403 B1 * | 6/2002 | Rodrigues et al. | 714/38 |
| 6,560,721 B1 * | 5/2003 | Boardman et al. | 714/33 |
| 6,598,223 B1 * | 7/2003 | Vrhel et al. | 717/174 |
| 6,615,373 B2 * | 9/2003 | Elko et al. | 714/47 |
| 6,772,083 B2 * | 8/2004 | Muller et al. | 702/123 |

\* cited by examiner

TEST TOOL AND METHODS FOR
FACILITATING TESTING OF DUPLEXED
COMPUTER FUNCTIONS

CROSS-REFERENCE TO RELATED
APPLICATIONS/PATENTS

This application contains subject matter which is related to the subject matter of the following applications/patents, each of which is assigned to the same assignee as this application. Each of the below-listed applications/patents is hereby incorporated herein by reference in its entirety:

"COUPLING OF A PLURALITY OF COUPLING FACILITIES USING PEER LINKS", Brooks et al. Ser. No. 09/968,244, filed herewith;

"RESTARTING A COUPLING FACILITY COMMAND USING A TOKEN FROM ANOTHER COUPLING FACILITY COMMAND", Elko et al. Ser. No. 09/968,729, filed herewith;

"DYNAMICALLY DETERMINING WHETHER TO PROCESS REQUESTS SYNCHRONOUSLY OR ASYNCHRONOUSLY", Jordan et al. Ser. No. 09/968,185, filed herewith;

"MANAGING THE STATE OF COUPLING FACILITY STRUCTURES", Elko et al. Ser. No. 09/968,248, filed herewith;

"SYNCHRONIZING PROCESSING OF COMMANDS INVOKED AGAINST DUPLEXED COUPLING FACILITY STRUCTURES", Elko et al., Ser. No. 09/968,179, filed herewith;

"SYSTEM-MANAGED DUPLEXING OF COUPLING FACILITY STRUCTURES", Allen et al. Ser. No. 09/968,242, filed herewith;

"METHOD, SYSTEM AND PROGRAM PRODUCTS FOR PROVIDING USER-MANAGED DUPLEXING OF COUPLING FACILITY CACHE STRUCTURES", Elko et al. Ser. No. 09/255,382, filed Feb. 22, 1999;

"CASTOUT PROCESSING FOR DUPLEXED CACHE STRUCTURES", Elko et al. Ser. No. 09/255,383, filed Feb. 22, 1999;

"SYSTEM-MANAGED REBUILD OF COUPLING FACILITY STRUCTURES", Allen et al. Ser. No. 09/378,780, filed Aug. 23, 1999;

"METHOD, SYSTEM AND PROGRAM PRODUCTS FOR COPYING COUPLING FACILITY STRUCTURES", Allen et al. Ser. No. 09/379,054, filed Aug. 23, 1999;

"METHOD, SYSTEM AND PROGRAM PRODUCTS FOR MODIFYING COUPLING FACILITY STRUCTURES", Dahlen et al. Ser. No. 09/379,435, filed Aug. 23, 1999;

"DIRECTED ALLOCATION OF COUPLING FACILITY STRUCTURES", Dahlen et al. Ser. No. 09/378,861, filed Aug. 23, 1999;

"METHOD, SYSTEM AND PROGRAM PRODUCTS FOR COPYING COUPLING FACILITY LOCK STRUCTURES", Allen et al. Ser. No. 09/379,053, filed Aug. 23, 1999;

"METHOD OF CONTROLLING THE FLOW OF INFORMATION BETWEEN SENDERS AND RECEIVERS ACROSS LINKS BEING USED AS CHANNELS", Gregg et al. Ser. No. 09/151,051, filed Sep. 10, 1998;

"SYSTEM OF CONTROLLING THE FLOW OF INFORMATION BETWEEN SENDERS AND RECEIVERS ACROSS LINKS BEING USED AS CHANNELS", Gregg et al. Ser. No. 09/150,942, filed Sep. 10, 1998;

"SYSTEM OF PERFORMING PARALLEL CLEANUP OF SEGMENTS OF A LOCK STRUCTURE LOCATED WITHIN A COUPLING FACILITY", Dahlen et al., U.S. Pat. No. 6,233,644 B1, issued May 15, 2001;

"MULTI CHANNEL INTER-PROCESSOR COUPLING FACILITY PROCESSING RECEIVED COMMANDS STORED IN MEMORY ABSENT STATUS ERROR OF CHANNELS", Elko et al., U.S. Pat. No. 5,574,945, issued Nov. 12, 1996;

"METHOD, SYSTEM AND PROGRAM PRODUCTS FOR MANAGING CHANGED DATA OF CASTOUT CLASSES", Elko et al., U.S. Pat. No. 6,230,243 B1, issued May 8, 2001;

"METHOD AND SYSTEM FOR CAPTURING AND CONTROLLING ACCESS TO INFORMATION IN A COUPLING FACILITY", Neuhard et al., U.S. Pat. No. 5,630,050, issued May 13, 1997;

"DYNAMICALLY ASSIGNING A DUMP SPACE IN A SHARED DATA FACILITY TO RECEIVE DUMPING INFORMATION TO BE CAPTURED", Elko et al., U.S. Pat. No. 5,664,155, issued Sep. 2, 1997;

"METHOD AND APPARATUS FOR DISTRIBUTED LOCKING OF SHARED DATA, EMPLOYING A CENTRAL COUPLING FACILITY", Elko et al., U.S. Pat. No. 5,339,427, issued Aug. 16, 1994;

"METHOD AND SYSTEM FOR LOG MANAGEMENT IN A COUPLED DATA PROCESSING SYSTEM", Geiner et al., U.S. Pat. No. 5,737,600, issued Apr. 7, 1998;

"METHOD OF PERFORMING PARALLEL CLEANUP OF SEGMENTS OF A LOCK STRUCTURE", Dahlen et al., U.S. Pat. No. 6,178,421 B1, issued Jan. 23, 2001;

"SPEEDING-UP COMMUNICATION RATES ON LINKS TRANSFERRING DATA STRUCTURES BY A METHOD OF HANDING SCATTER/GATHER OF STORAGE BLOCKS IN COMMANDED COMPUTER SYSTEMS", Gregg et al., U.S. Pat. No. 5,948,060, issued Sep. 7, 1999;

"METHOD OF MANAGING RESOURCES IN ONE OR MORE COUPLING FACILITIES COUPLED TO ONE OR MORE OPERATING SYSTEMS IN ONE OR MORE CENTRAL PROGRAMMING COMPLEXES USING A POLICY", Allen et al., U.S. Pat. No. 5,634,072, issued May 27, 1997;

"METHOD AND APPARATUS FOR OPTIMIZING THE HANDLING OF SYNCHRONOUS REQUESTS TO A COUPLING FACILITY IN A SYSPLEX CONFIGURATION", Kubala et al., U.S. Pat. No. 5,923,890, issued Jul. 13, 1999;

"METHOD FOR RECEIVING MESSAGES AT A COUPLING FACILITY", Elko et al., U.S. Pat. No. 5,706,432, issued Jan. 6, 1998;

"COMMAND EXECUTION SYSTEM FOR USING FIRST AND SECOND COMMANDS TO RESERVE AND STORE SECOND COMMAND RELATED STATUS INFORMATION IN MEMORY PORTION RESPECTIVELY", Elko et al., U.S. Pat. No. 5,392,397, issued Feb. 21, 1995;

"SOFTWARE CACHE MANAGEMENT OF A SHARED ELECTRONIC STORE IN A SUPPLEX", Elko et al., U.S. Pat. No. 5,457,793, issued Oct. 10, 1995;

"REQUESTING A DUMP OF INFORMATION STORED WITHIN A COUPLING FACILITY, IN WHICH THE DUMP INCLUDES SERVICEABILITY INFORMATION FROM AN OPERATING SYSTEM THAT LOST COMMUNICATION WITH THE COUPLING FACILITY", Neuhard et al, U.S. Pat. No. 5,860,115, issued Jan. 12, 1999;

"AUTHORIZATION METHOD FOR CONDITIONAL COMMAND EXECUTION", Elko et al, U.S. Pat. No. 5,450,590, issued Sep. 12, 1995;

"IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION", Elko et al., U.S. Pat. No. 5,561,809, issued Oct. 1, 1996;

"COUPLING FACILITY FOR RECEIVING COMMANDS FROM PLURALITY OF HOSTS FOR ACTIVATING SELECTED CONNECTION PATHS TO I/O DEVICES AND MAINTAINING STATUS THEREOF", Elko et al., U.S. Pat. No. 5,463,736, issued Oct. 31, 1995;

"METHOD AND SYSTEM FOR MANAGING DATA AND USERS OF DATA IN A DATA PROCESSING SYSTEM", Allen et al., U.S. Pat. No. 5,465,359, issued Nov. 7, 1995;

"METHODS AND SYSTEMS FOR CREATING A STORAGE DUMP WITHIN A COUPLING FACILITY OF A MULTISYSTEM ENVIRONMENT", Elko et al., U.S. Pat. No. 5,761,739, issued Jun. 2, 1998;

"METHOD AND APPARATUS FOR COUPLING DATA PROCESSING SYSTEMS", Elko et al., U.S. Pat. No. 5,317,739, issued May 31, 1994;

"METHOD AND APPARATUS FOR EXPANSION, CONTRACTION, AND REAPPORTIONMENT OF STRUCTURED EXTERNAL STORAGE STRUCTURES", Dahlen et al., U.S. Pat. No. 5,581,737, issued Dec. 3, 1996;

"SYSPLEX SHARED DATA COHERENCY METHOD", Elko et al., U.S. Pat. No. 5,537,574, issued Jul. 16, 1996;

"MULTIPLE PROCESSOR SYSTEM HAVING SOFTWARE FOR SELECTING SHARED CACHE ENTRIES ON AN ASSOCIATED CASTOUT CLASS FOR TRANSFER TO A DASD WITH ONE I/O OPERATION", Elko et al., U.S. Pat. No. 5,493,668, issued Feb. 20, 1996;

"INTEGRITY OF DATA OBJECTS USED TO MAINTAIN STATE INFORMATION FOR SHARED DATA AT A LOCAL COMPLEX", Elko et al., U.S. Pat. No. 5,331,673, issued Jul. 19, 1994;

"COMMAND QUIESCE FUNCTION", Elko et al., U.S. Pat. No. 5,339,405, issued Aug. 16, 1994;

"METHOD AND APPARATUS FOR PERFORMING CONDITIONAL OPERATIONS ON EXTERNALLY SHARED DATA", Elko et al., U.S. Pat. No. 5,742,830, issued Apr. 21, 1998;

"METHOD AND SYSTEM FOR RECONFIGURING A STORAGE STRUCTURE WITHIN A STRUCTURE PROCESSING FACILITY", Allen et al., U.S. Pat. No. 5,515,499, issued May 7, 1996;

"METHOD FOR COORDINATING EXECUTING PROGRAMS IN A DATA PROCESSING SYSTEM", Allen et al., U.S. Pat. No. 5,604,863, issued Feb. 18, 1997; and "SYSTEM AND METHOD FOR MANAGEMENT OF OBJECT TRANSITIONS IN AN EXTERNAL STORAGE FACILITY ACCESSED BY ONE OR MORE PROCESSORS", Dahlen et al., U.S. Pat. No. 5,887,135, issued Mar. 23, 1999.

TECHNICAL FIELD

This invention relates, in general, to software testing within a distributed computing environment, and more specifically, to a test tool and testing techniques for facilitating testing of duplexed coupling facility structures.

BACKGROUND OF THE INVENTION

Certain distributed computing environments, such as parallel sysplexes, today provide a nonvolatile shared storage device called a coupling facility, that includes multiple storage structures of either the cache or list type. These structures provide unique functions for the operating system and middleware products employed for the efficient operation of a parallel sysplex. For example, the cache structures provide directory structures and cross-invalidation mechanisms to maintain buffer coherency for multisystem databases, as well as a fast write medium for database updates. These are used by, for instance, the data sharing versions of DB2 and IMS, offered by International Business Machines Corporation, Armonk, N.Y.

The list structures provide many diverse functions. One such list structure function is to provide for high-performance global locking, and this function is exploited by such products as the IMS Resource Lock Manager (IRLM) and the Global Resource Serialization (GRS) function in OS/390, offered by International Business Machines Corporation, Armonk, N.Y. Another list structure function is to provide a message passing mechanism with storage for maintaining multiple messages on a per system basis and a mechanism for notifying a system of the arrival of new messages. This function is exploited by the XCS component of OS/390, which in turn is exploited by numerous multi-system applications for providing a means to pass messages between their various instances. A third list structure function is to provide for shared queue structures that can be ordered and accessed by LIFO/FIFO ordering, by key, or by name. Workload Manager (WLM), IMS Shared Message Queues and MQ Series, all offered by International Business Machines Corporation, Armonk, N.Y., are examples of exploiters of this feature. These three functions provide examples of list structure uses, but this is not an exhaustive list.

Various components of a parallel sysplex have been documented in numerous applications/patents, which are listed above and hereby incorporated herein by reference in their entirety. The capabilities defined in those applications/patents provide the basic system structure to create and manage single cache and list structure instances. Additionally, various of the patents and applications listed above provide extensions to the base functions of the parallel sysplex that support the creation and configuration of dual structure instances.

In many situations, a failure of the coupling facility that contains various structures requires significant recovery actions to be taken by the owning applications. For example, for database caches and queues, this may require using backup log data sets and/or tapes. This is a time-consuming process that results in a loss of access to the application during the recovery operation. Other structures, such as lock tables, may require reconstruction of partial lock tables from in-storage copies along with failures of in-flight transactions. Still other structures, such as message-passing structures, may lose all data and require re-entry from the application. So, there is a proliferation of diverse recovery schemes with different recovery times and impacts. Add to that the fact that failure of a coupling facility results in all resident structures failing, with recovery actions occurring concurrently. This can cause serious disruptions in the parallel sysplex.

Thus, a need exists for a parallel sysplex that has less disruptions. In particular, a need exists for a high-availability coupling facility, which improves on the recovery times and impacts of existing recovery techniques, while also provides for a consistent recovery design across various structure types.

As a particular example, a need exists for a capability that duplexes structures in two separate coupling facilities Many of the above-incorporated, co-filed patent applications teach this capability for duplexing structures in two separate coupling facilities. As a result of these teachings, a further need exists for facilitating testing of such duplexed structures.

Software testing is an ongoing task in computer software program development and maintenance which requires a large portion of development time, computer and human resources, and effort. Software may include the development of an entirely new application or program, or the addition of a new feature to an existing application or system. Software maintenance activities generally include the correction of reported problems.

Testing is performed with a goal of verifying the correct functioning of new software and modifications to existing software. Generally, software testing accompanies even minor code modifications or enhancements to ensure correctness. Verifying the correctness of software may involve numerous tasks ranging from ensuring coding syntax through successful compilation, to checking the execution results by examining the output of a software program.

Generally, as complexity of software programs increases, the amount of testing and the need for efficient testing increases as well. As one example, in view of the teachings of the above-incorporated applications, techniques are now needed to facilitate testing of a duplexed structure, such as a duplexed coupling facility structure.

SUMMARY OF THE INVENTION

The shortcomings of the prior art are overcome and additional advantages are provided through the provision of a method of facilitating testing of a computer function. The method includes: obtaining a testcase written for a first environment; and automatically driving the testcase in a second environment to facilitate testing of a function of the second environment. Enhancements include providing one or more switches within a test tool which define at least one driven characteristic of the testcase in the second environment. As one example, the first environment may comprise a simplex environment, and the second a duplex environment. Name mapping is also provided so that when a testcase written for the first environment specifies a system of the first environment upon which at least a portion thereof is to execute, the automatically driving includes mapping the testcase to the second environment, the mapping including selecting a system of the second environment upon which the at least a portion of the testcase is to execute.

In another aspect, a method of processing a testcase within a plurality of testing environments is provided herein. This method includes: allowing for indication of a testing environment within which a testcase is to execute, the environment comprising one environment of a plurality of testing environments; and at execution time of the testcase, checking the indication of the testing environment and controlling testcase processing based upon the indication of the testing environment within which the testcase is to execute. As an example, the plurality of testing environments might include at least some of a functional test environment, a system test environment, and an engineering test environment.

In yet another aspect, a method of controlling process flow between a test tool and a system processing an event is provided. This method includes: controlling an event around system processing thereof; and wherein the controlling comprises facilitating intercepting of the event by a test tool after processing thereof by the system and before return to an internal system invoker of the system event processing, the invoker being other than the test tool. As one example, the event comprises a system managed event having no external system call.

A method of presenting test results of a testcase employed to test a computer function of a sysplex is also presented. This method includes: passing system test results from a sysplex to a test tool, wherein the system test results comprise multiple types of messages; within the test tool, setting at least one display characteristic of at least one message based on message type; and displaying by the test tool system test results, including the at least one message having the at least one display characteristic set based on message type.

In still another aspect, a method of testing a system-managed duplexed structure is set forth. This method includes: testing a system-managed duplexed structure employing a testcase, the system-managed duplexed structure comprising a primary structure and a secondary structure; and wherein the testing further includes generating a request for one instance of the system-managed duplexed structure and processing that request, the processing including determining whether the one instance of the system-managed duplexed structure is the primary structure or the secondary structure; responsive to that determining, obtaining primary structure information or secondary structure information corresponding to the one instance, and employing the primary structure information or secondary structure information and directing the request to the one instance. In an enhanced embodiment, the system-managed duplexed structure is a coupling facility structure, and the request comprises at least one of reading information from the one instance of the coupling facility structure, updating information in the one instance of the coupling facility structure, deactivating duplexing in the one instance of the coupling facility structure or retrieving information about the coupling facility structure itself. Further, when the one instance comprises the secondary structure, the request can be directed to the secondary structure without breaking duplexing of the system-managed duplexed structure.

In a further aspect, during testing of a computer function, a method is provided for propagating an environmental error indication in a multi-system environment. The method includes: responsive to identifying an environmental error in a first system of the multi-system environment, invoking a request from a testcase executing on the first system for an environmental error indication; sending the environmental error indication from the first system to at least one second system of the multi-system environment also executing the testcase; and receiving the environmental error indication at the at least one second system and responsive thereto terminating execution of the testcase at the at least one second system. In an enhanced embodiment, the method comprises automatically terminating execution of the testcase on each system of the multi-system environment responsive to identifying the environmental error at the first system, the automatically terminating including the sending and the receiving of the environmental error indication.

In a still further aspect, the invention comprises a method of processing a multi-system testcase within a sysplex. This method includes: providing each system of the multiple systems of the sysplex with a capability to wait during processing of a multi-system testcase for a requested message which may be issued from any other system of the multiple systems; processing the multi-system testcase on the multiple systems of the sysplex; when a wait for requested processing occurs on one system of the multiple systems during the testcase processing, having the one system wait for a message to be generated by any other system of the multiple systems indicating that the requested processing has been completed, wherein the one system waiting for the message to be generated is unaware of which other system of the multiple systems is performing the requested processing; and continuing execution of the testcase on the one system of the multiple systems responsive to generation of the message by any other system of the multiple systems.

Systems and computer program products corresponding to the above-summarized methods are also described and claimed herein.

To restate, described hereinbelow is an enhanced test tool for facilitating, for example, testing of duplexed computer functions. The test tool (or component test tool) enables existing testcases to test multiple new functions such as those disclosed in the above-incorporated, co-filed applications. For example, the test tool includes switches which in one embodiment may comprise one or more of a UDFORDER queue switch, a NAMECLASSMASK switch, a duplex switch, a nowait duplex switch, a sync switch and/or an async switch, each of which is described in detail herein. Generally stated, these switches can be employed to force a testcase, or more specifically a request of a testcase to be driven in a particular manner or mode in order to test different environments and process flows.

Numerous advantages of regression testing using the above-noted test tool switches are provided. For example, testing can start as soon as code becomes available, even before the start of formal function/component test (FCT). Existing testcases can be employed, even if written for a different environment. For example, testcases written for a simplex environment can be used in a duplex environment, in accordance with an aspect of the present invention. Testcases can be run several times during a project to ensure that a function has not been regressed. The same testcase can be run several times to test different functions. For example, the same testcase may be run in a simplex environment, a duplex environment, and an async or sync mode, for either the simplex or duplex environment, and in a nowait duplex mode.

Advantageously, the present invention facilitates early exposure of defects in new computer code and leads to greater stability during formal functional testing. Additionally, problems can be discovered that might escape formal functional testing, including base problems, intermittent problems and problems caused by more than one function being executed simultaneously.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
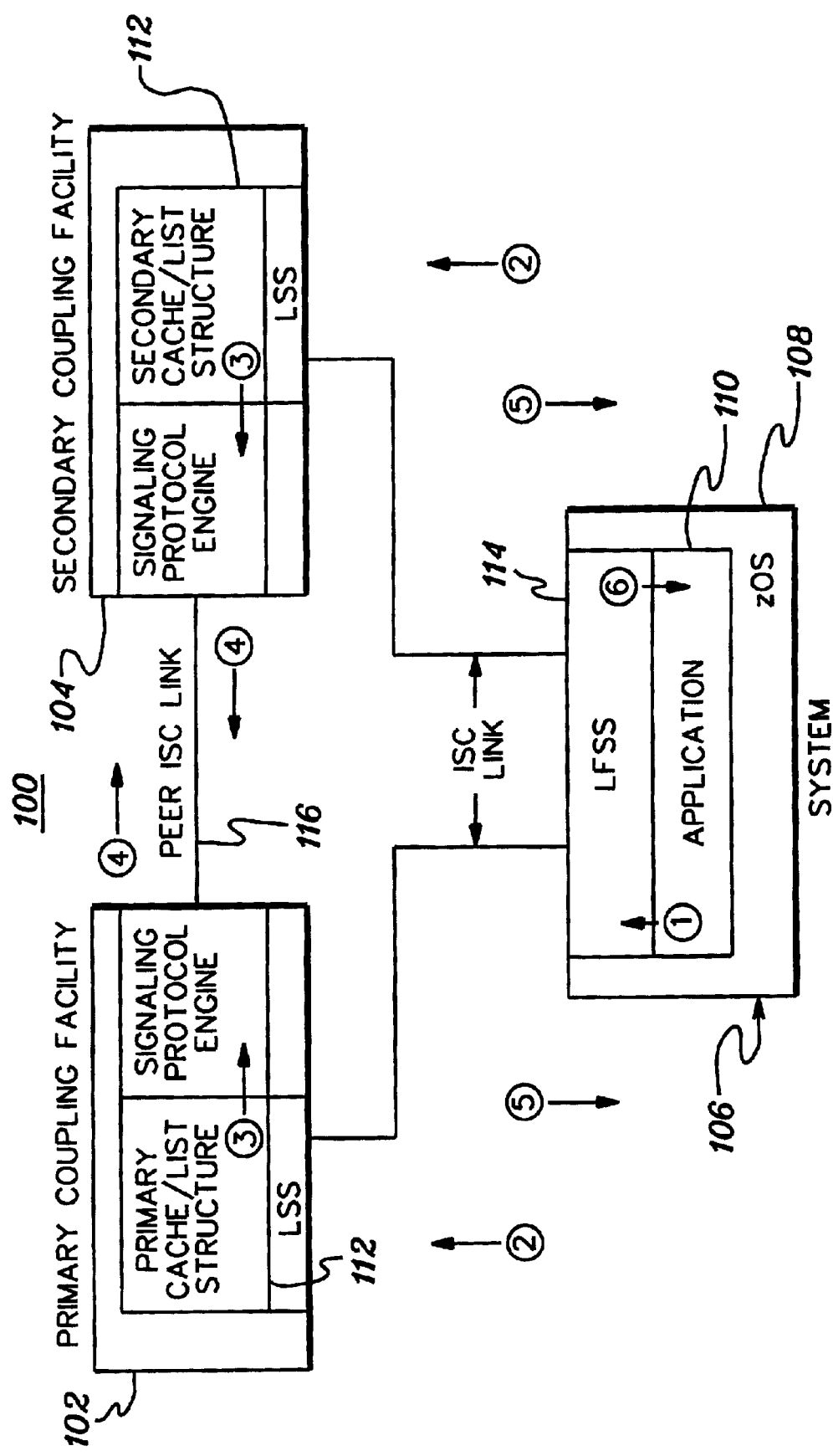
FIG. 1 depicts one example of a duplexing model in which a plurality of coupling facilities are coupled to one another via a peer link, in accordance with an aspect of the present invention.

Generally stated, provided herein are various enhancements to a test tool and to testing techniques for facilitating testing of computer functions, and in particular, for facilitating testing a duplexed computer structure, such as a duplexed coupling facility structure.

Depending on the system, there may be thousands of existing testcases for testing structures in a simplex environment. The test tool provided herein facilitates testing of requests to duplexed structures using, e.g., simplex created testcases. Thus, in one aspect, presented herein is a testing technique which facilitates taking a testcase written for a first environment and driving the testcase in a second environment to facilitate testing of a function of the second environment. The driving of the testcase is accomplished without modifying the testcase. In one example, the first environment comprises a simplex environment and the second environment a duplex environment.

Testing is further facilitated by the provision of multiple switch functions which define at least one driven characteristic of the testcase in the second environment. These switch functions, which are described in detail below, include a sync switch, async switch, duplex switch, duplex nowait switch, UDFORDER switch, and a NAMECLASSMASK switch. Certain switch functions are mutually exclusive, such as the sync switch function and async switch function, while others are not, such as the async switch function and duplex switch function.

In another aspect, a test tool is provided with a system name mapping function. This function allows a testcase written for a first environment which specifies a system of the first environment upon which at least a portion of the testcase is to execute, to be mapped to a second environment. In one example, the first environment is a first sysplex at a first test stage and the second environment a second sysplex at a second test stage. The mapping includes referencing a table in the test tool, wherein the table embodies system name mapping between the first environment and the second environment.

Additional enhancements described hereinbelow include controlling process flow between a test tool and a system to allow the test tool to intercept a system managed event both before and after processing thereof, and an ability to signal to a testcase the test environment within which the case is being executed, i.e., whether the environment comprises a functional test environment, a system test environment or an engineering test environment. Certain process modifications may be desirable depending upon the particular test environment. Also provided is a method for parsing system test results and setting the display characteristic of at least one message type for presentation thereof by the test tool in order to facilitate operator viewing of that message type, particularly when displaying test results from a sysplex.

Various verbs and macros are also provided to facilitate both duplex structure testing and writing of new testcases for duplexed structures. For example, an XESXLFXR verb is provided which directs a testcase request to one instance of a duplexed structure. An ERROR verb facilitates propagation of an environmental error indication between systems in a multi-system environment wherein the systems are each executing a different portion of a testcase concurrently. The various macros described hereinbelow include a WHENMSG macro which allows a system in a multi-system environment the capability to wait for a message being issued by any other system of the multiple systems and upon receipt of that message to notify the other systems to continue execution of the testcase.

The above description is a high level overview of certain aspects of the present invention, and those skilled in the art will note that various additional aspects of the invention are also described and claimed herein. Before describing the test tool enhancements further, one embodiment of an environment within which the test tool could be used is set forth below.

FIG. 1 depicts one embodiment of a configuration 100, which includes two coupling facilities 102, 104 coupled to a system 106 in a parallel sysplex. In one example, the system is running an instance of the zOS operating system 108, offered by International Business Machines Corporation, Armonk, N.Y. Further, in one example, the system is running an application 110 that is coupled to a coupling facility structure 112 (either of cache or list type), whose location is not known to the application. The actual physical connection is managed by an LFSS component 114 of the zOS operating system and commands initiated by the user application flow through the LFSS component.

Two instances of the coupling facility structure are maintained in separate coupling facilities, referred to as the primary coupling facility and the secondary coupling facility. A peer link 116, such as an Intersystem Channel (ISC) link, couples the two coupling facilities. The peer ISC link can transmit both primary message commands and secondary message commands in either direction. This may be physically represented by either two unidirectional links, one with a sender channel on the primary coupling facility and receiver channel on the secondary coupling facility, and the second link oppositely configured. This may also be represented by a single physical link where the channel interface in each coupling facility supports both sender and receiver functionality. This latter capability exists in ISC3 links and their variants: ICB3 and IC3, all of which are offered by International Business Machines Corporation, Armonk, N.Y.

The peer ISC link between the coupling facilities is used, for instance, to exchange message path commands on the primary message command interface to configure and connect the two coupling facilities. Once configured and coupled, the peer ISC link is also used to send secondary commands of the list-notification type to exchange signals as part of the signaling protocol for command execution. The sending and receiving of these secondary commands is managed by a coupling facility component called a signaling protocol engine 118. Requests by the cache and list component of the coupling facility for sending and receiving duplexing signals flow through the signaling protocol engine.

One embodiment of the steps in a normal command execution for the coupling facility-to-coupling facility duplexing model are shown in FIG. 1 in numeric sequence that approximates the time sequence of the command. In these steps, various components of the signaling protocol are described. A more complete description of the signaling protocol is provided in a following section. The extensions to the protocol described later are used to enhance the performance and reliability of the basic protocol described here.

Step 1. The user application generates a command and communicates this command to the LFSS through a system macro interface.

Step 2. The LFSS creates two copies of the command, sending one to the primary coupling facility and the second to the secondary coupling facility. The LFSS uses the asynchronous SEND MESSAGE interface without notification to allow the two commands to be initiated in parallel. The LFSS also sets a synchronize completion on initial status (SCIS) bit of the SEND MESSAGE to minimize the effects of any busy conditions encountered on the channel interface. The link-subsystem (LSS) component in the primary coupling facility receives the command and transfers control to the cache or list component, as appropriate. Likewise, the link-subsystem (LSS) component in the secondary coupling facility receives the command and transfers control to the cache or list component, as appropriate.

Step 3. The cache/list component of the primary coupling facility executes the command to the point where the message response block (MRB) would be returned to the application. But before sending the MRB and while the internal latches are held for the objects referenced by the command, a request is made to the signaling protocol engine in the primary coupling facility to send a completion signal on the peer ISC link to the secondary coupling facility. Likewise, the cache/list component of the primary coupling facility executes the command to the point where the MRB would be returned to the application. But before sending the MRB and while the internal latches are held for the objects referenced by the command, a request is made to the signaling protocol engine in the secondary coupling facility to send a completion signal on the peer ISC link to the secondary coupling facility.

Step 4. The signaling protocol engine in the primary coupling facility sends the completion signal to the secondary coupling facility and then waits for the reception of the completion signal from the secondary coupling facility. Likewise, the signaling protocol engine in the secondary coupling facility sends the completion signal to the primary coupling facility and then waits for the reception of the completion signal from the primary coupling facility.

Step 5. When the primary coupling facility recognizes the reception of the completion signal from the secondary coupling facility, the primary coupling facility sends the MRB and releases the latches. Likewise, when the secondary coupling facility recognizes the reception of the completion signal from the primary coupling facility, it also sends the MRB and releases the latches. If a failure occurs during this period of time and either the primary coupling facility or the secondary coupling facility fails to recognize the reception of a completion signal, then duplexing is broken by the coupling facility by resetting the duplexing active indicator for the structure.

Step 6. Assuming no errors have occurred, the LFSS receives both MRBs from the two coupling facilities and constructs a single message response block by reconciling the results of the two MRBs and gives this response to the application. If, on the other hand, duplexing has been broken by one of the two coupling facilities, then the operating system will invoke fail-over recovery and one of the two structures will be selected as the surviving instance. Once the error is corrected, duplexing can be reestablished.

User transparency is provided because the duplexing functions are performed by the LFSS without awareness by the user application.

Failure isolation is provided by creating two identical copies of the structure in separate facilities, each of which can continue as the surviving structure in a situation involving the failure of the other.

Command atomicity is provided by maintaining latches on both structures until both commands complete.

Performance is optimized in several ways. First, sending the commands in parallel allows for maximum overlap of data transfer and command execution. Second, by exchanging completion signals immediately upon reaching the MRB send point in the command, the completion can be detected with minimal intervening latency. Third, the amount of data sent in the signal itself is small relative to the amount of data sent on the primary link for the command. So, a single peer ISC link can handle the combined signal traffic generated by commands sent on a significant number of primary ISC links. In fact, for small distances, a single ISC link can handle the combined traffic of the commands generated in a 32-system Parallel Sysplex. Fourth, by using list notification as the signaling transport mechanism, the signal can be processed by the receiver channel engine without needing to interrupt the coupling facility control code (CFCC) to process the signal. Fifth, by using the SCIS facility, contention detected by a SEND MESSAGE can be minimized by causing redrives to be performed substantially immediately.

As noted above, various enhancements to a test tool and operating system code are described hereinbelow for facilitating, e.g., driving of a testcase to test computer functions in different environments and process flows without requiring modification to the testcase.

Component Test Tool

A component test tool or simply test tool (TT) can comprise a testing application which is run on an operating system, such as the above-referenced zOS operating system, offered by International Business Machines Corporation. The test tool facilitates execution of testcases which are used to test a software function or structure. Various versions of such a test tool are available in the marketplace. For example, Mercury Interactive of Sunnyvale, Calif. markets Enterprise Testing Tools; Rational of Cupertino, Calif. markets System Testing Tools, and Segue of Lexington, Mass. markets a Silk Test testing tool.

In accordance with the above-incorporated, co-filed patent applications, duplex requests to coupling facility structures now need to be tested. For example, existing IXLLIST/IXLCACHE/IXLRT/IXLLOCK/IXLSYNCH/ IXLLSTC/IXLLSTM/IXLLSTE requests need to be tested as duplexed requests to system managed duplex structures. Writing traditional testcases to test these request types with all supporting options would require thousands of new testcases to be written Alternatively, the present invention recognizes in one aspect that existing regression testcases written for a simplex environment can be converted to testcases to issue requests to a duplexed structure to allow a duplex function to be tested with less resources.

Thus, in one aspect, support is added herein to a test tool to allow an existing regression testcase to be driven for testing requests to a duplexed coupling facility structure. There are two ways to set a TT switch such that subsequent testcases submitted will attempt to system-manage duplex the testcase structure upon the first connect (e.g., IXLCONN) request to that structure the testcase issues.
1) Via operator command F TTX,SPECIALFLAG= XESSMDUPLXNG
2) Via TT defaults file statement SPECIALFLAG= XESSMDUPLXNG.

Individual testcases can also use this support via the SPECIALFLAG=XESSYNCASYNC on the testcase INIT statement.

When TT parses a testcase, it checks the setting of the SPECIALFLAG keywords. When SPECIALFLAG= XESSYNCASYNC is on, the testcase contains an XESCONN statement, and it sets bits in a testcase execution table to indicate whether a user or system managed rebuild is allowed by the testcase. Parsing an XESREBLD or CFERROR verb will set an indication to disable the duplexing switch. At testcase execution time for the XESCONN verb, if the duplexing switch is on and parse did not indicate to disable the switch, TT changes the keywords specified by the testcase to include ALLOWAUTO=YES. If the structure being connected to indicates that DUPLEX(ALLOWED) or DUPLEX(ENABLED) is specified in the policy, the XESCONN request will wait for the structure to reach the duplex established phase before returning control to the testcase. It does this by issuing an IXLREBLD request= startduplex for testcases using structures with DUPLEX (ALLOWED) in the CFRM policy and then waiting for the Structure Available event to be presented to the event exit for structures that either had DUPLEX(ALLOWED) or DUPLEX(ENABLED) in the CFRM policy. For IXLCONN requests with TYPE=CACHE TT, using the CONE (CONnect request Element) address from the returned contoken for the IXLCONN request, TT sets a bit in the CONE control block (i.e., a system control block for the IXLCONN request) to indicate that TT is duplexing the structure for XESLIST, XESLSTM or XESRT verbs at execution time, the testcases' RESTARTTOKEN keyword is changed to the EXTRESTOKEN keyword and an extended restart token is generated by extracting the structure version from the CONE control block for the contoken in use. For XESCACHE verbs an extended restart token is not generated, but the IXLCACHE service routine checks the bit set in the CONE by TT and will allow the RESTARTTOKEN keyword to be used instead of the required IXLCACHE EXTRESTOKEN keyword.

By having the test tool duplex the structure without testcase intervention, existing testcases that tested simplex coupling facility functions can be used to test the corresponding requests issued to a duplexed structure.

In order to facilitate the driving of testcases written for a first environment in a second environment, various switch functions are described herein for inclusion in the test tool. In certain cases, the switch functions also comprise modifications to the operating system code, which are also described below. As one example, the operating system is assumed to comprise a z/OS operating system having certain known IXL commands. The z/OS operating system is described in detail in the following IBM publications, each of which is hereby incorporated herein by reference in its entirety:

"z/OS V1R1.0 MVS Programming Sysplex Services Guide", SA22-7617-00;
"z/OS V1R1.0 MVS Programming Sysplex Services Reference", SA22-7618-00; and
"z/OS V1R1.0 MVS Setting Up A Sysplex", SA22-7625-00.

In one embodiment, the test tool application is provided with multiple switch functions, which as noted, enhance use of pre-existing testcases. These switch functions include an async switch function, a sync switch function, an IXLCONN UDFORDER switch function and a NAMECLASSMASK switch function, a duplex switch function, and a duplex nowait switch function. Detailed discussion of each of these switches and their associated logic is provided below.

Test Tool—Async Switch

The z/OS operating system is to include updates to internal IXLLOCK processing to allow lock requests to the coupling facility to be driven asynchronously, where prior operating system releases only issued lock requests synchronously to the coupling facility. These changes resulted in a rewrite of the mainline function of IXLLOCK processing. The decision of whether the IXLLOCK request is to be driven sync or async is based on internal tables of service times. The testing of this code requires that both the sync and async paths for all IXLLOCK requests be tested. Existing test tools and regression testcases could drive one of the paths, depending on system performance, but no control over the drive mode has been available. In order to test this new code, a way is needed to drive both the sync and async paths without writing a large amount of new testcases.

A solution is to add logic to the TT (component test tool) to allow a user to specify via an external parameter how an IXLLOCK request is to be processed by the system. For example, by setting the XESSYNCASYNC, existing testcases could be executed with all IXLLOCK requests driven asynchronously to the coupling facility. Without this parameter set, the system heuristic code would decide how the request is to be processed.

Figure 2A:
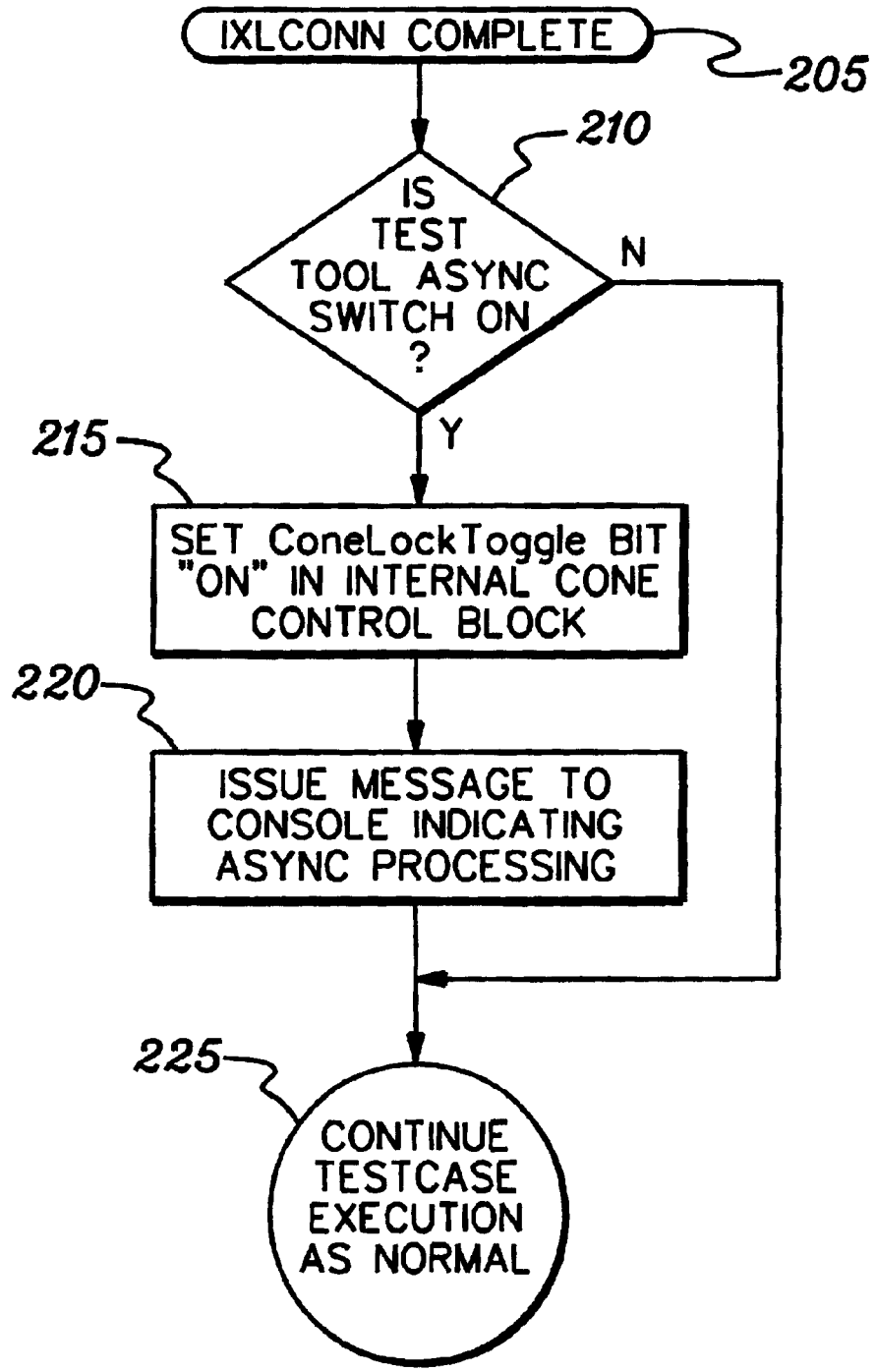
FIG. 2A depicts one embodiment of runtime logic associated with a test tool async switch function, in accordance with an aspect of the present invention.
Figure 2B:
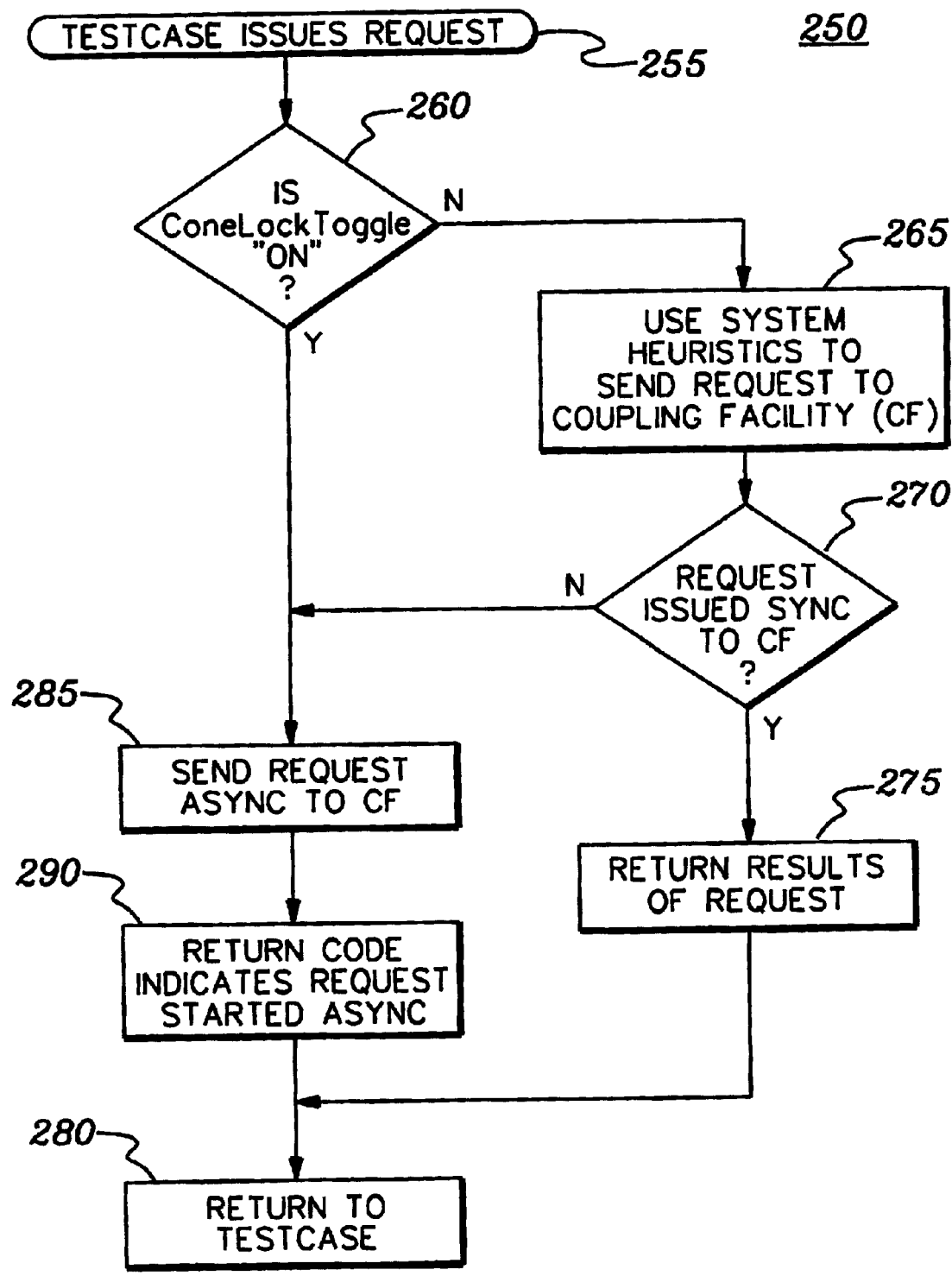
FIG. 2B depicts one embodiment of operating system logic for processing a test tool async switch function, in accordance with an aspect of the present invention.

One embodiment of a TT async switch is processed in two parts as shown in FIGS. 2A & 2B. One part is in the TT tool code 200 (see FIG. 2A) and the other is in the z/OS code 250 (see FIG. 2B).

When a TT testcase is executing a statement for an IXLCONN request 205 (FIG. 2A), it checks to see if the TT's async switch is "on" 210. If "no", the TT continues testcase execution as normal 225. If "yes", the TT sets a bit (Cone Lock Toggle) in the internal system control representing the connection to the structure 215 and issues a message to the console indicating all requests the connector issues will be issued asynchronously to the coupling facility 220, after which testcase execution as normal is continued 225.

As shown in FIG. 2B, when the testcase issues a request to the coupling facility via the IXLLOCK, IXLLIST, IXLCACHE, IXLRT or IXLSYNCH services 255, the system code checks the ConeLockToggle bit 260. If the bit is set, the request is sent asynchronously to the coupling facility 285. Otherwise, the system heuristic is used to determine how the request will be issued to the coupling facility 265. If system heuristics are used to send the request to the coupling facility, processing determines whether the request is to be issued synchronously to the coupling facility 270. If "no", then the request is sent asynchronously to the coupling facility 285. If "yes", then the result of the request, for example, a return code is provided 275 and control returns to testcase 280. If the request is sent asynchronous to the coupling facility, the testcase is notified via a return code which indicates that the request was started asynchronously 290 prior to return of processing to the testcase 280. The testcase is thus notified the request was issued async or is given results.

The above-summarized logic allows a single testcase to use the heuristic decision making or the asynchronous flow of the IXLLOCK request without being modified. When combined with the SYNC switch, the NOWAIT switch and the DUPLEX switch (which are described below) the same unmodified testcase can be used to test several different environments and flows in the system code.

Test Tool—Sync Switch

As noted, the z/OS operating system is to include updates to internal IXLLOCK processing to allow lock requests to the coupling facility to be driven asynchronously where prior system releases only issued lock requests synchronously to the coupling facility. These changes resulted in a rewrite of the mainline function of IXLLOCK processing. The decision of whether the IXLLOCK request is to be driven sync or async is based on internal tables of service times. The testing of this code requires that both the sync and async paths for all IXLLOCK requests be tested. Existing test tools and regression testcases could drive one of the paths, depending on system performance, but control over the drive mode has been unavailable. In order to test the new code, a way is needed to drive both the sync and async paths without writing a large amount of new testcases.

A solution is to add support to the TT (test tool) to allow a user to specify via an external parameter how an IXLLOCK request is to be processed by the system. For example, by setting the XESREQUESTSYNC, existing testcases could be executed with all IXLLOCK, IXLLIST, IXLCACHE, IXLRT and IXLSYNCH requests driven synchronously to the coupling facility if possible. Without this parameter set, the system heuristics code could decide how a request is to be processed.

Figure 3A:
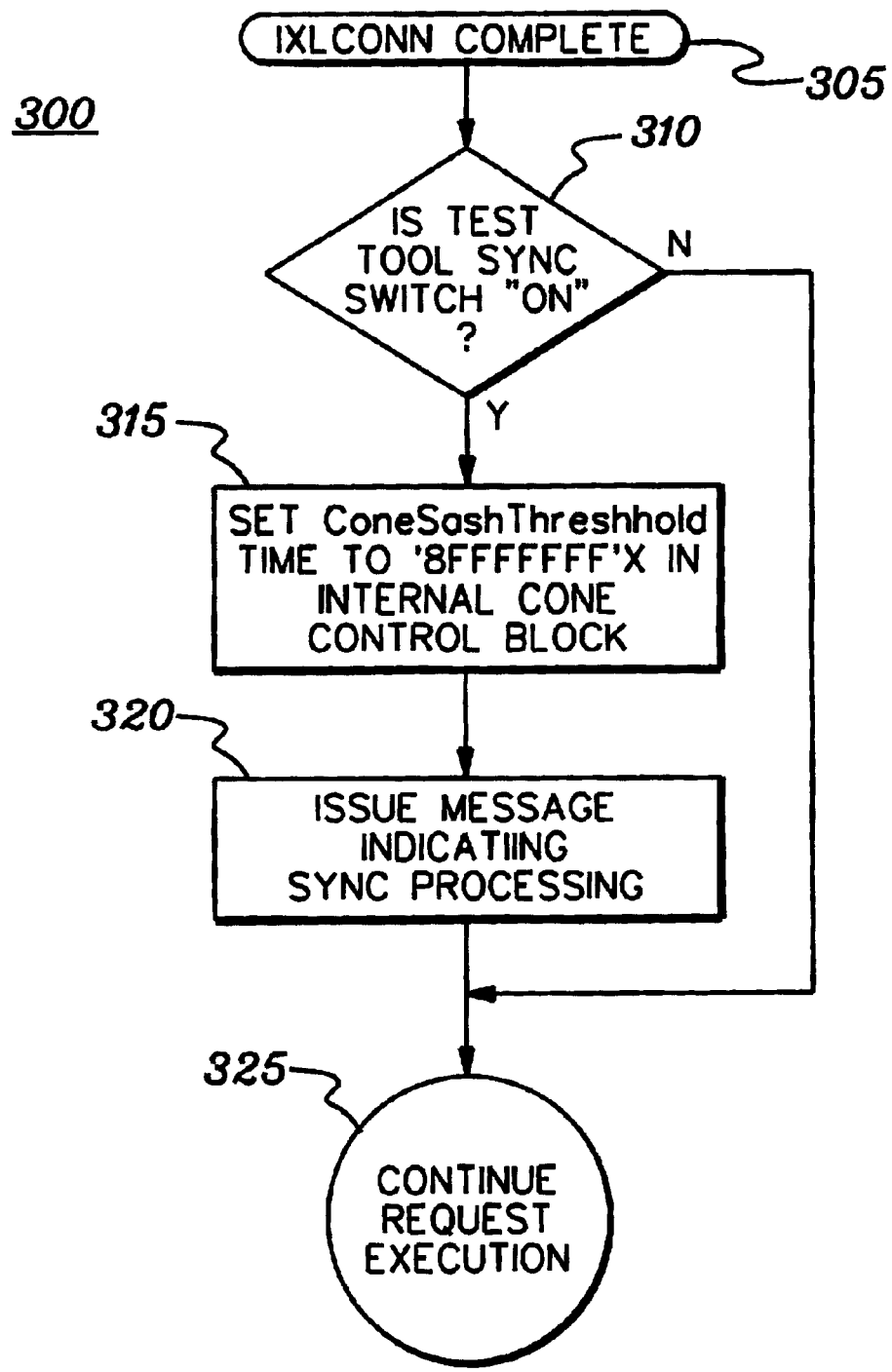
FIG. 3A depicts one embodiment of runtime logic associated with a test tool sync switch function, in accordance with an aspect of the present invention.

In one embodiment, a TT async switch is processed in two parts. One part is in the TT tool code 300 (FIG. 3A) and the other is in the z/OS code 350 (FIG. 3B).

When a TT testcase is executing a statement for an IXLCONN request 305 (FIG. 3A), it checks to see if the TT's sync switch is "on" 310. If "no", the TT continues testcase execution as normal 325. If "yes", the TT sets a field (ConeSashThreshhold Time) in the internal system control representing the connection to the structure to, e.g., '8ffffffff'x 315, and issues a message to the console indicating that all requests the connector issues will be attempted synchronously to the coupling facility 320, after which testcase execution continues 325.

Figure 3B:
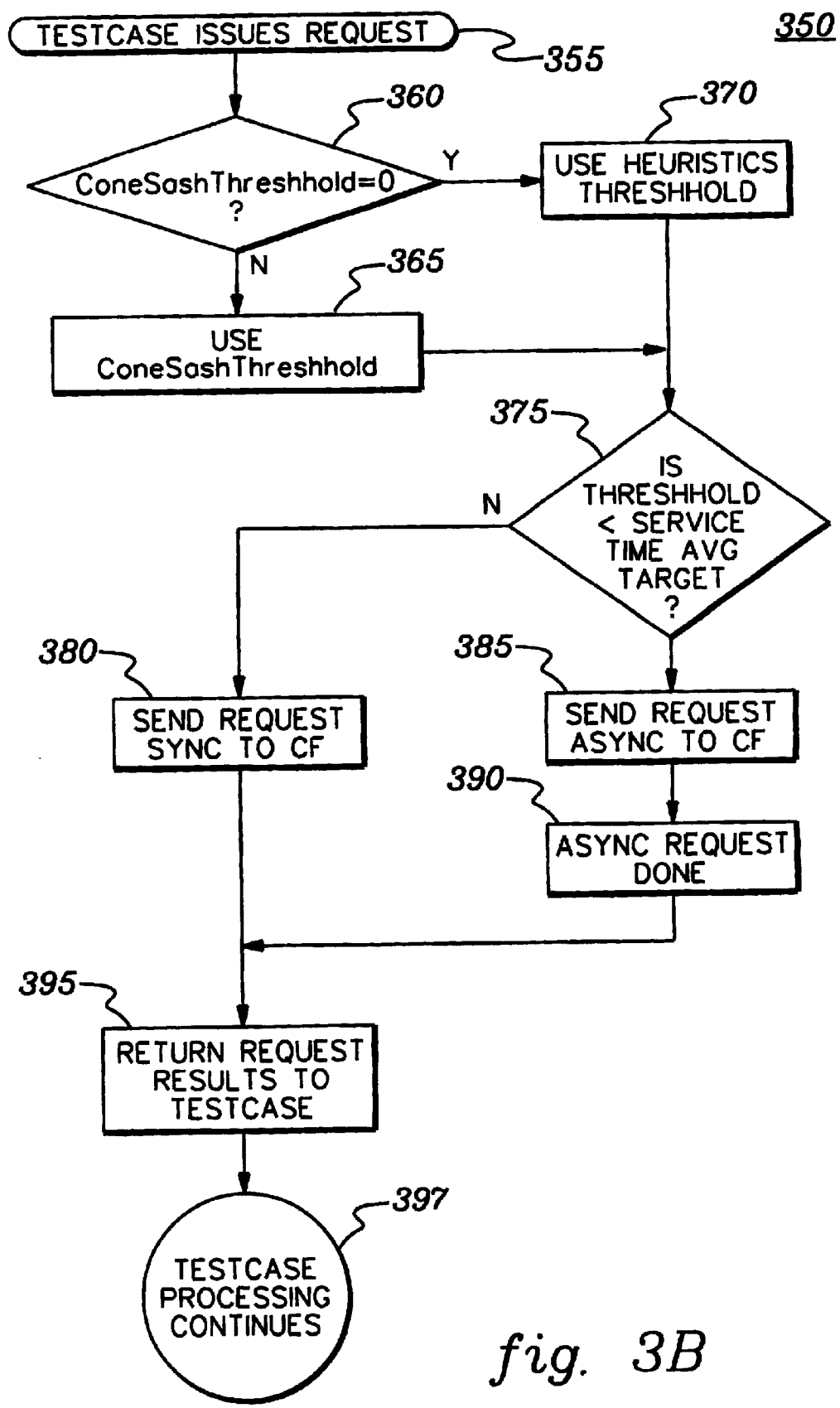
FIG. 3B depicts one embodiment of operating system logic for processing a test tool sync switch function, in accordance with an aspect of the present invention.

As shown in FIG. 3B, when the testcase issues a request to the coupling facility via the IXLLOCK, IXLLIST, IXLCACHE, IXLRT or IXLSYNCH service 355, system code checks the ConeSashThreshold time field for "0" 360. If the field is not zero, it uses the ConeSashThreshhold value 365. Otherwise, a system heuristic value is used 370. If the value used is less than an average time target (i.e., a system value to convert to async) 375, the request will be issued to (for example) the coupling facility synchronously 380. Otherwise the request is driven async 385. The testcase is then notified that the request was issued async 395, and is given request results 395. Thereafter, testcase processing continues 397.

Note that the above-summarized logic allows a single testcase to test both the heuristic decision making and the synchronous flow of the IXLLOCK request without being modified by having TT set a very large value in ConeSashThreshHold Time. When combined with the ASYNC switch, the NOWAIT switch and the DUPLEX switch, the same unmodified testcase can be used to test several different environments and flows in the system code.

Test Tool—IXLCONN UDFORDER and NAMECLASSMASK switches

Cache structures in coupling facilities can be allocated with different options at different CFLEVELs. The different options affect the processing of IXLCACHE commands within the coupling facility. At a CFLEVEL>=5, cache structures support UDF order queues and at a CFLEVEL>=7 they support NAMECLASS Masks. Name class masks allows a pattern definition to be applied to entry names for purposes of assigning entries to name classes in a structure. Name classes may be used by the coupling facility to improve the efficiency of processing for commands such as IXLCACHE REQUEST=DELETENAME. UDF order queues for a structure cause castout class queues to be maintained in user data fields order. Testing of these changes to structure processing impacted requests other than the ones that were externally visible. For dupexed structures, this would require a large amount of testcases to cover all possible combinations of structure options and requests. A way is thus needed to allow existing testcases to be executed with different structure options without changes, since the externally visible results would not change based on the different internal processing.

A solution to this need is to add support to the TT (component test tool) to allow a user to specify the state of one or more switches which control allocation of the coupling facility cache structure. UDF order queues and NAMECLASSMASK switches can be used separately or together.

Figure 4:
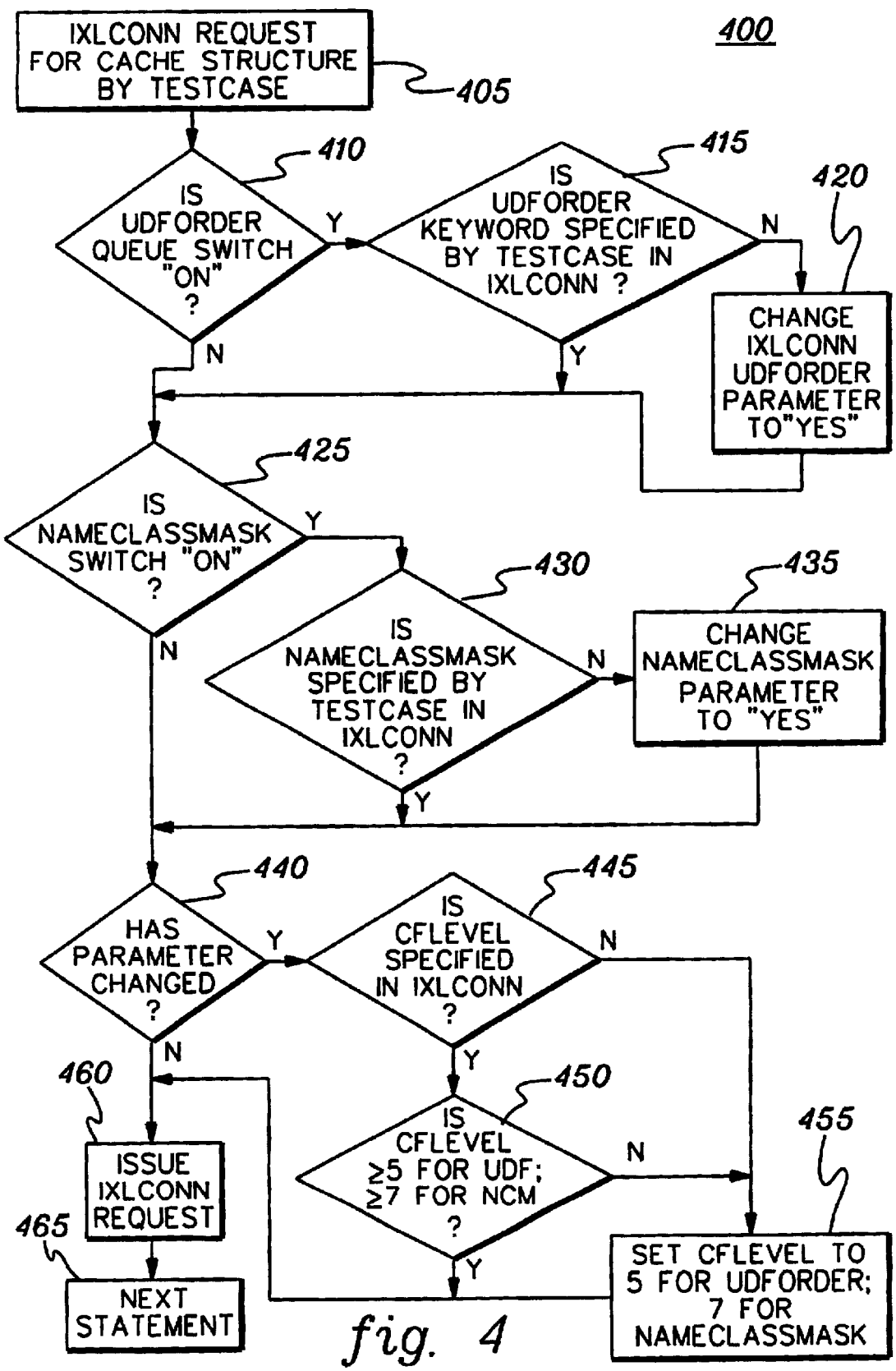
FIG. 4 depicts one embodiment of logic associated with a test tool UDFORDER queue switch and NAMECLASSMASK switch functions, in accordance with an aspect of the present invention.

Referring to FIG. 4, as a TT testcase executes an IXLCONN statement 495, it checks to see if the UDFORDER QUEUE switch is "on" 410. If "yes", it checks to see if the testcase specified the IXLCONN UDFORDER keyword 415. If it did, then TT does not modify the IXLCONN parameters. Otherwise, TT changes the request parameters to be UDFORDER(YES) 420. Next, TT checks to see if the NAMECLASSMASK switch is "on" 425. If "yes", it checks to see if the testcase specified the IXLCONN NAMECLASSMASK keyword 430. If "no", then the NAMECLASSMASK parameter is changed to "yes" 435. Otherwise, TT checks to see if either of the two parameters was changed 440, and if "yes" again it checks to see if the CFLEVEL is specified 445, because IXLCONN has a minimum required cflevel for both keywords. If the IXLCONN CFLEVEL keyword is not specified, or is less than 5 with the UDFORDER parameter changed, or is less than 7 with the NAMECLASSMASK parameter changed 450, TT sets the minimum cflevel to 5 or 7, respectively 455. It then issues the IXLCONN request 460, after which the next statement is processed 465.

The above-summarized logic allows existing coupling facility cache structure testcases to be executed without modification of the testcase source to cover certain differences in internal coupling facility processing. Running the same testcase with different combinations of the UDF order queue and NAMECLASSMASK switches allows the same testcase to test multiple paths of the coupling facility code.

Test Tool Duplex and Duplex Nowait Switches

The system-managed duplexing support in the z/OS operating system and CFLEVEL are to include updates allowing a structure in a coupling facility to be duplex into another coupling facility. At the time duplexing is established, some or all of the contents of the primary structure are copied into a secondary structure. While the structure is copied, access to the structure is quiesced and any new requests are held by the system until the structure contents have been copied. Then, each subsequent request issued by a connector to the structure is driven to the duplexed pair of structures as a simplex operation, a duplexed operation, or a combination of a simplex operation followed by a duplexed operation. The validation of the updated z/OS and CFCC code require that each possible command be executed to a duplexed structure with as many of the command options as possible.

To support system-managed duplexing protocols, an application would need to change the IXLCONN ALLOWAUTO keyword to be YES and change any IXLCACHE, IXLLIST or IXLRT requests that use the RESTOKEN keyword to use the EXTRESTOKEN keyword. The connections event exit will receive new Structure State Change, Structure Temporarily Unavailable and Structure Available events. All other processing for system managed duplexing is to be transparent to the application. There are a large set of existing testcases that cover the majority of the commands and options for coupling facility requests, which were created as each coupling facility function was created. In order to test system managed duplexing support, without aspects of the present invention, each of the existing testcases would have to be copied and modified to support system managed duplexing, as well as new testcases created. This would require a large amount of resources to accomplish.

A technique allowing existing testcases to be used to cover new code without copying and/or modifying each testcase to support duplexing is therefore desired.

Existing testcases are written in the internal TT (component test tool) language. Support is thus added to TT to allow a user to specify via an external parameter how a testcase connects to and uses a coupling facility structure. By setting new XESSMDUPLXNG or XESSMDUPLXNOWAIT switches, existing testcases can be executed against a coupling facility structure that is in the duplex established phase of a duplexing rebuild, or against a structure that undergoes duplexing start during the testcase execution. The XESSMDUPLXNG switch gets the structure duplex established before any request is issued, such that the testcase issues requests against a duplex established structure. The XESSMUPLXNOWAIT switch starts a duplexing rebuild, but allows testcase execution to continue in parallel with the structure starting duplexing. This tests the system code to quiesce structure access when starting duplexing. The switch can be set in the TT control file or in the testcase on the INIT statement. The INIT statement initializes test tool processing for the testcase. Support is also added to filter out at testcase parse time any testcase that is unable to execute if the structure is system managed duplexed.

Processing for the duplexing switches is accomplished by TT at testcase parse time and execution time, and by z/OS at execution time.

Figure 5:
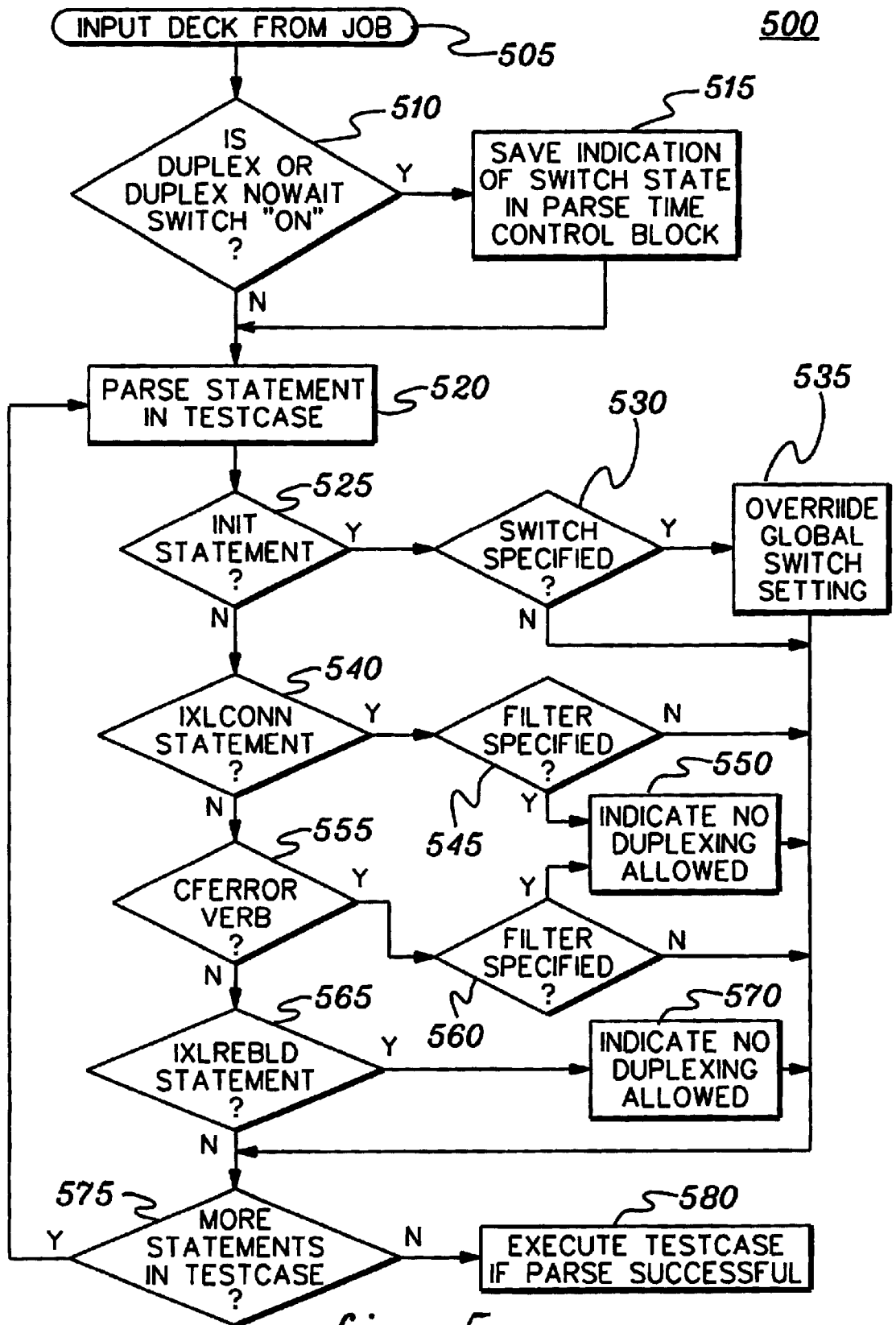
FIG. 5 depicts one embodiment of logic associated with a test tool duplex switch and duplex nowait switch functions, showing processing at testcase parse time, in accordance with an aspect of the present invention.

At testcase parse time (see FIG. 5), the testcase and its statements are input 505, and a check is made to see if either the XESSMDUPLXNG or XESSMDUPLXNOWAIT switch is set "on" in the default file 510. If either is "on", an indication of which is set is saved for use at execution time 515. The testcase statements are then parsed one at a time 520. If the testcase statement is an INIT statement 525, it checks for one of the duplex switches being specified 530. If one was, the value is saved 535 and overrides the value saved at 515. Processing then checks for an additional statement 575 and parsing continues.

Figure 6:
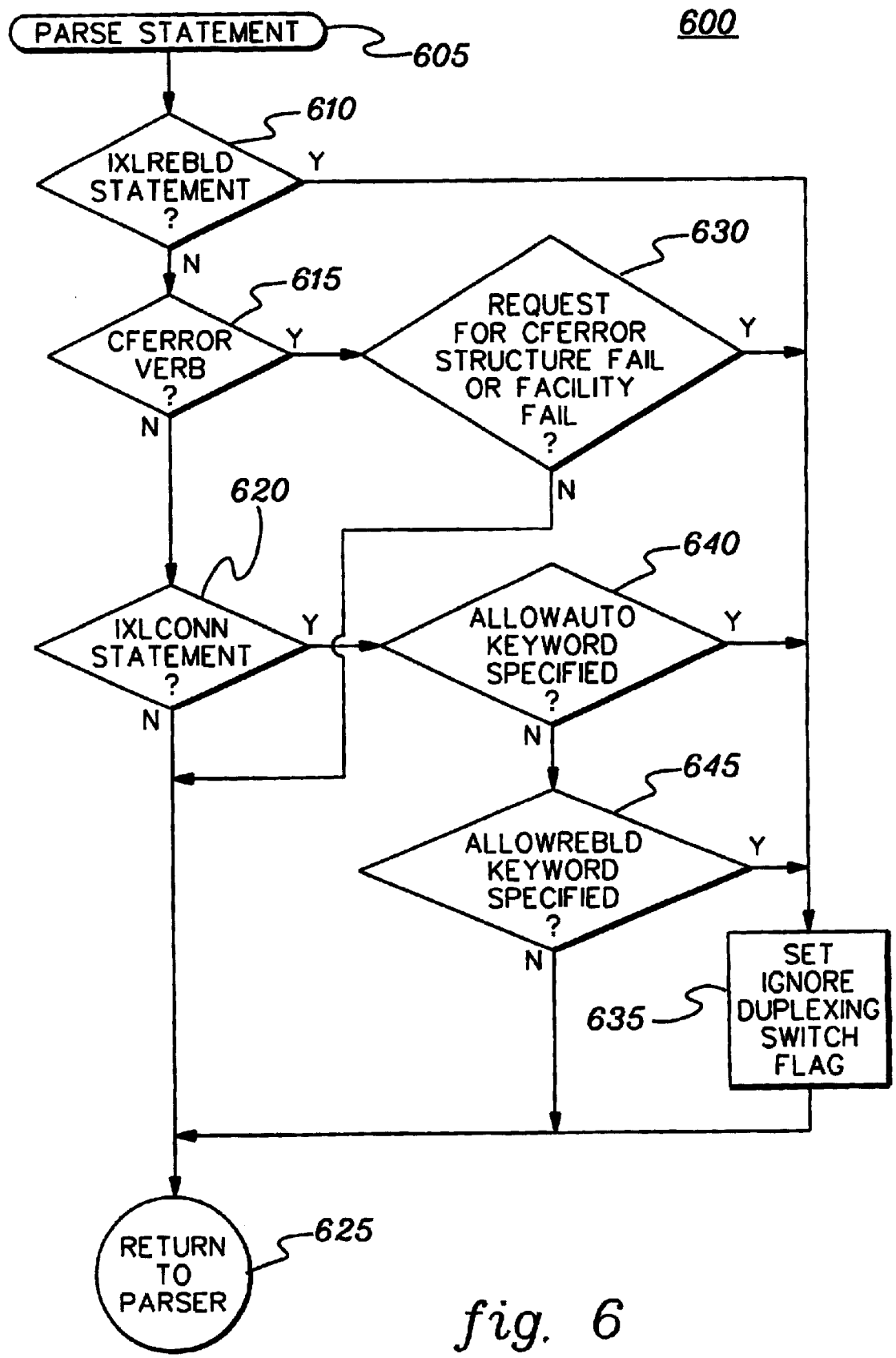
FIG. 6 depicts one embodiment of logic associated with a duplex switch filter for filtering testcases not to be duplexed, in accordance with an aspect of the present invention.

If the statement is an IXLCONN statement 540, a check is made to see if any of the keywords are specified that makes it ineligible for duplex processing 545. One embodiment of this filtering is described below with reference to FIG. 6. If the testcase should not duplex, an indication that the testcase is not allowed to duplex is saved 550. If the statement is a CFERROR statement 555, a check is made to see if any of the keywords are specified that makes it ineligible for duplex processing 560. The filtering is again described below. If the testcase should not duplex, an indication that the testcase is not allowed to duplex is saved 550. If the statement is an IXLREBLD statement 565, an indication that the testcase is not allowed to duplex is saved 570. Once all statements have been processed 575, testcase execution begins 580, i.e., assuming that the parsing was successful.

The filtering 600 done at parse time (see FIG. 6) makes ineligible for duplex processing testcases that are unable to execute properly if the structure is duplexed. For example, testcases that are written to test user managed rebuild functions would fail if the structure is duplexed, and testcases that are testing structure failure would have the structure fail, if one instance of a duplexed structure is hidden from the testcase. A parse statement 605 is initially evaluated to determine if the statement is an IXLREBLD statement 610. If "yes", an indication is set that duplexing is not allowed 635 and processing returns to the parser 625. If the statement is a CFERROR verb 615, processing determines whether the CFERROR structure failure or facility failure keywords are set 630. If "yes", an indication is set that duplexing is not allowed 635, otherwise processing returns to the parser. If the statement is an IXLCONN statement 620, and if the ALLOWAUTO keyword 640 or the ALLOWREBLD 645 keyword is set, an indication that duplexing is not allowed is set 635. Thereafter, processing returns to the parser 625.

Figure 7:
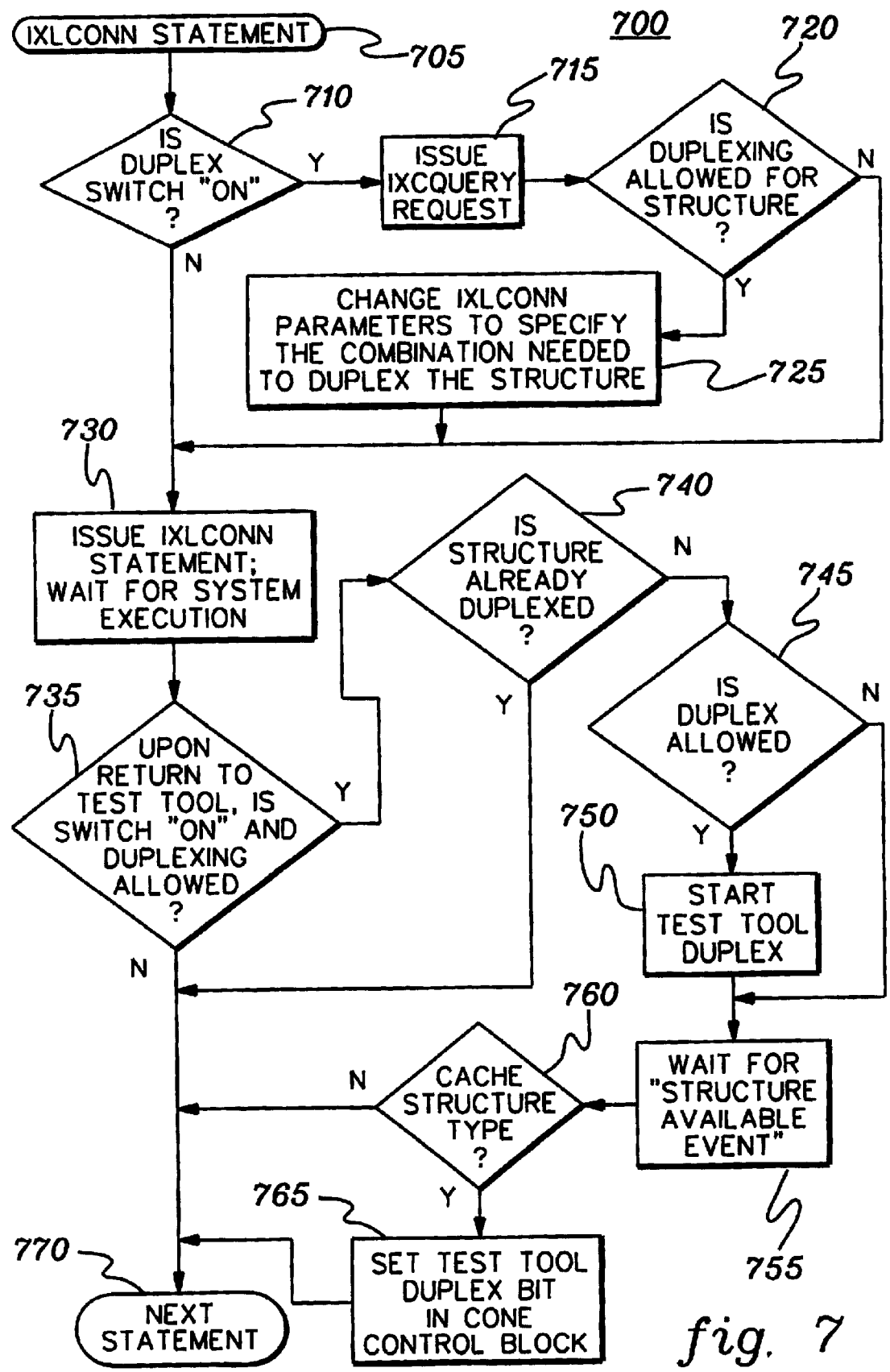
FIG. 7 depicts one embodiment of logic associated with a test tool duplex switch showing execution of an IXLCONN statement, in accordance with an aspect of the present invention.

If the testcase parses successfully, statement execution 700 begins (see FIG. 7). At execution time for an IXLCONN statement 705, processing checks to see if one of the duplexing switches is "on" 710, and that duplexing has not been prevented by the filtering. If duplexing is allowed, an IXCQUERY request 715 is done for the structure to see if the CFRM policy has DUPLEX(ALLOWED) or DUPLEX(ENABLED) 720. If either value is specified in the CFRM policy, the IXLCONN parameters are modified to also specify the ALLOWAUTO=YES keyword 725.

The IXLCONN request is then issued 730. If the IXLCONN is successful, a duplexing switch is set and the CFRM policy specifies DUPLEX(ALLOWED) or DUPLEX(ENABLED) 735, then processing determines if the structure is not already duplexed 740 and the CFRM policy specifies DUPLEX(ALLOWED) 745. If so, an IXLREBLD REQUEST=STARTDUPLEX is issued for the structure 750. In either case, where duplexing is allowed, and it is not the NOWAIT switch, TT will wait on an ECB for the structure to become duplexing by waiting for the event exit to receive the "Structure Available Event" 755. Once the event is presented, if the structure is a cache structure type 760, a bit is set in the system CONE control block representing the connection that indicates this connection is using TT's duplexing switch code 765. The next statement 770 is then processed. Note that each connection is required to have an event exit, which TT has code to handle.

Figure 8:
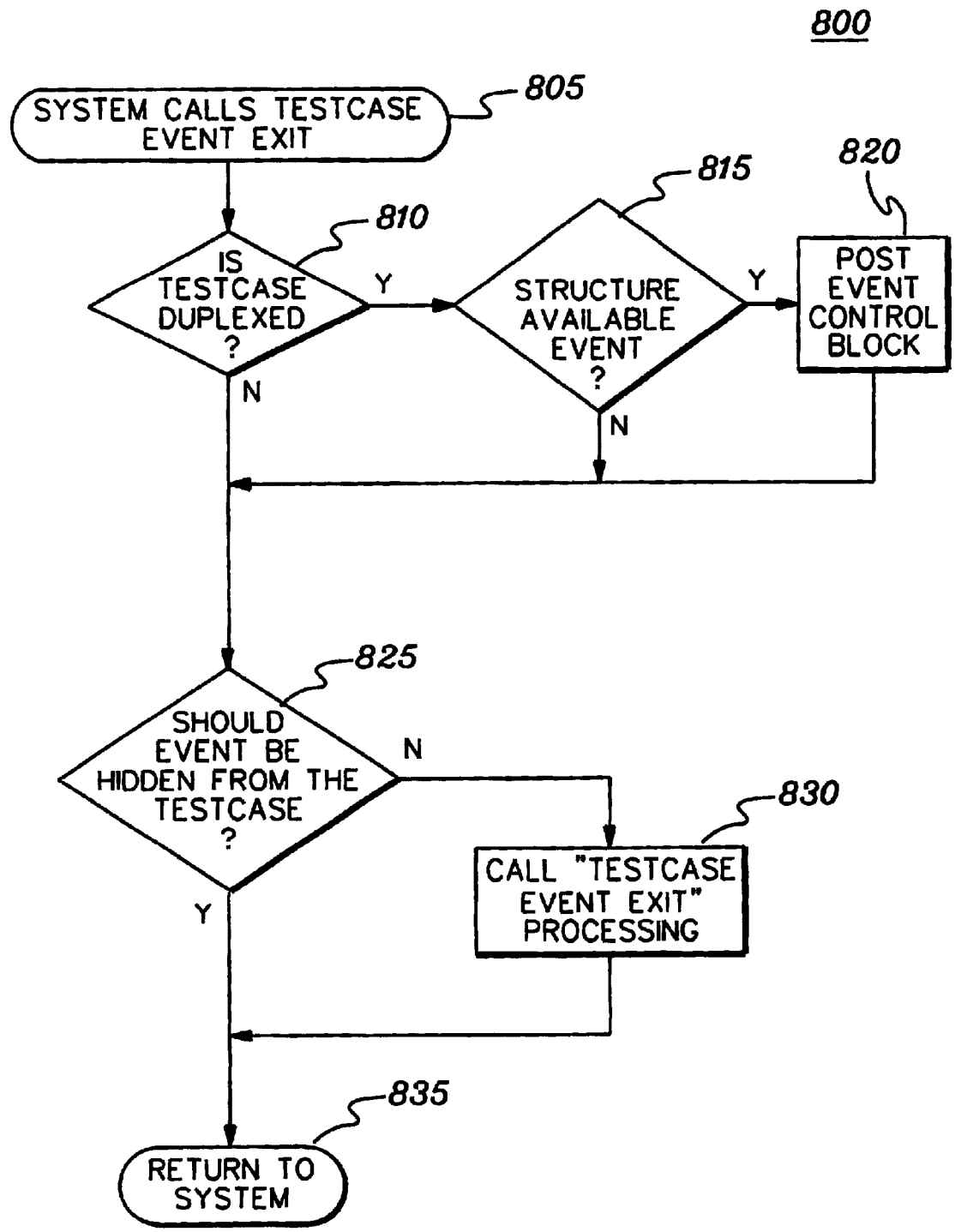
FIG. 8 depicts one embodiment of logic associated with a test tool duplex switch showing event exit processing, in accordance with an aspect of the present invention.

If TT changes the IXLCONN keywords to specify ALLOWAUTO=YES, the event exit processing deals with events differently as shown by logic 800 of FIG. 8. When an event is presented to the event exit by the system 805, TT checks to see if the testcase is using the duplexing switches 810. If "yes", and if the event is a "structure available event" 815, it posts ECB which the IXLCONN routine is waiting on 820. Processing then checks to see if the event is a structure available event, structure temporarily unavailable event or structure state change event 825. If it is not one of these events, it calls the testcase event exit routine 830, before returning to system processing 835.

Figure 9:
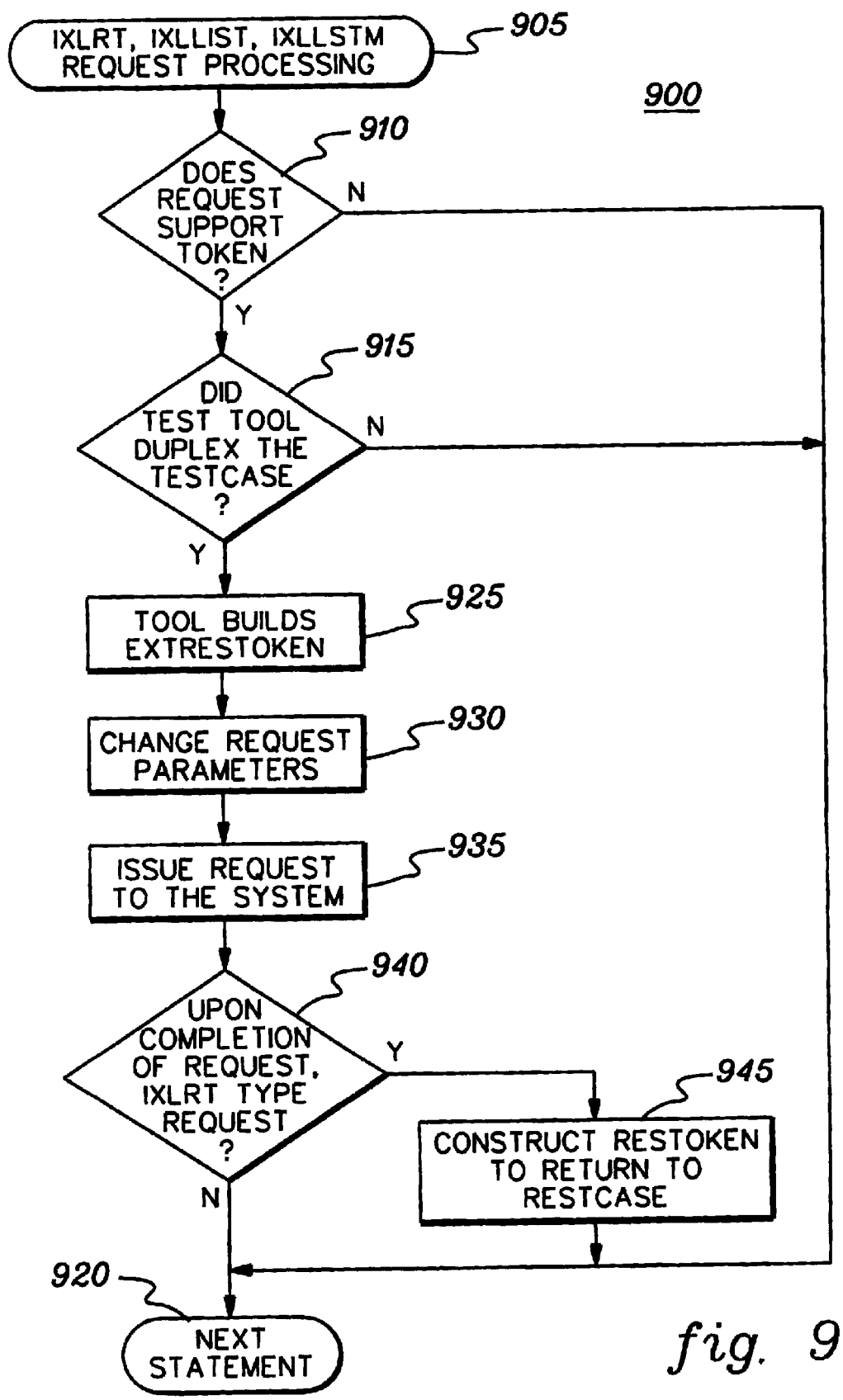
FIG. 9 depicts one embodiment of logic associated with IXLRT, IXLLIST & IXLLSTM request processing by a test tool, in accordance with an aspect of the present invention.

Once control is returned to the testcase after the IXL-CONN statement has been processed, it will issue requests to the structure. Connections that use the ALLOWAUTO=YES keyword need to supply EXTRESTOKEN instead of the RESTOKEN keyword. As shown in logic 900 of FIG. 9, if the structure type is list or lock and the request type is IXLRT, IXLLIST or IXLLSTM 905, then TT checks to see if the request uses the RESTOKEN keyword 910. If not, the request is issued to the system and processing advances to the next statement 920. If it does, and TT duplexed the testcase 915, it builds an extended restart token using the structure version and the specified RESTOKEN 925. TT then changes the request parameters to use the EXTRESTOKEN keyword instead of the RESTOKEN keyword 930 and issues the request 935. Once the request completes, no further work is necessary for the IXLLIST and IXLLSTM requests because the RESTOKEN value that needs to be returned to the testcase as part of the returned EXTRESTOKEN is at the same offset in the answer area as the RESTOKEN would have been. If the request is an IXLRT request 940, TT takes the RESTOKEN portion of the returned EXTRESTOKEN and places it in the correct location to be returned as a RESTOKEN to the testcase 945.

Figure 10:
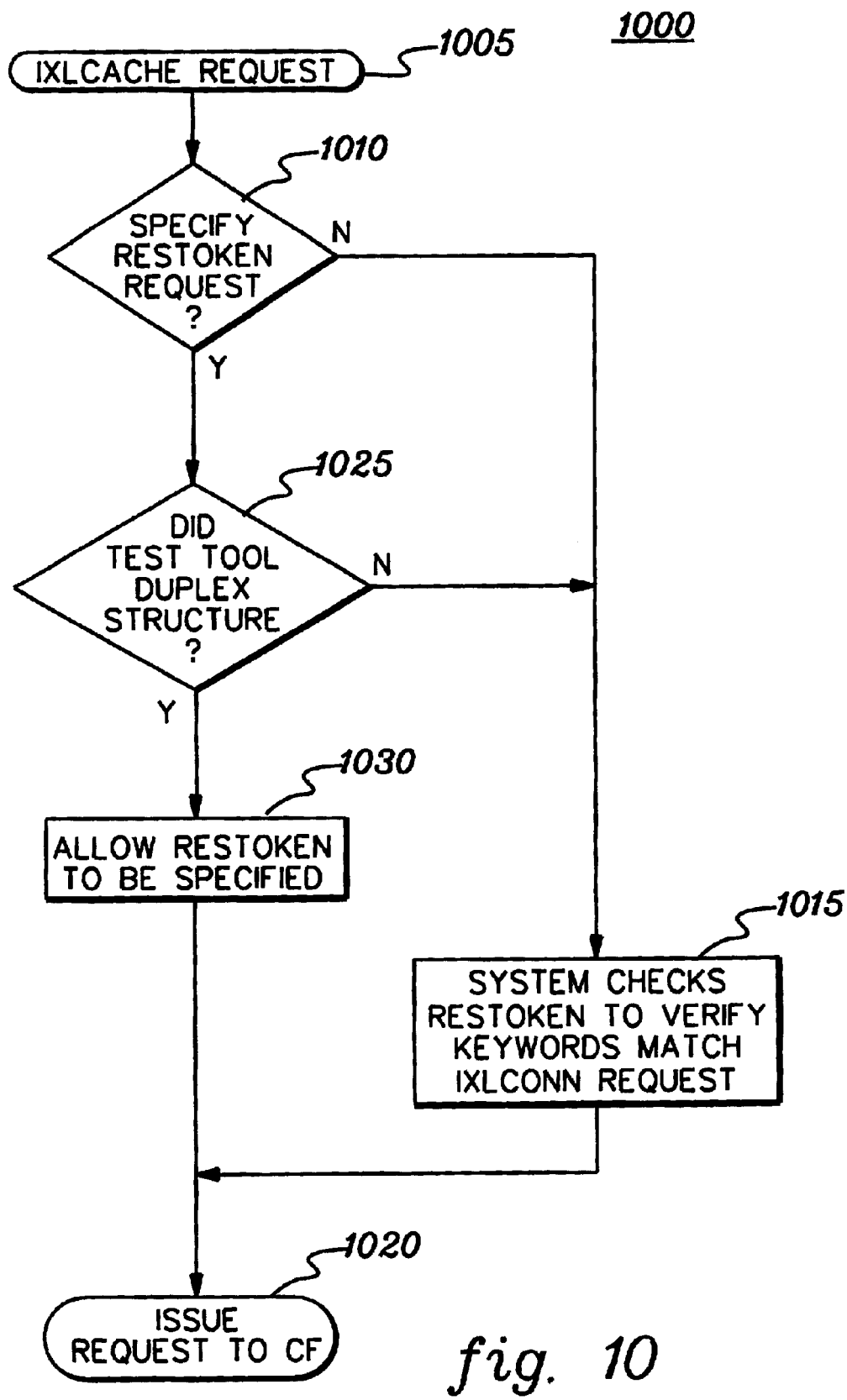
FIG. 10 depicts one embodiment of operating system logic for processing an IXLCACHE request for facilitating test tool duplexing, in accordance with an aspect of the present invention.

If the structure type is a cache structure a different process 1000 is employed (FIG. 10). The offsets for RESTOKEN and EXTRESTOKEN do not overlap in the IXLCACHE answer areas. This would have meant extensive changes to TT to cover all possible cases, so instead of converting the request to use EXTRESTOKEN, the z/OS code is modified herein to allow RESTOKEN to be specified for connections that have had a bit set in the internal CONE control block by TT's IXLCONN processing. For each IXLCACHE request issued 1005, z/OS code checks to see if the request specifies a RESTOKEN 1010, and if so, it checks to see if the connection is using TT's duplexing support 1025. If "yes" again, it allows use of the RESTOKEN keyword 1030, instead of failing the request. If either checks at 1010 or 1025 fail, the z/OS RESTOKEN keyword checks are processed 1015, after which the system processes the request 1020.

TT's System-Managed Event Interceptor

System code in OS/390 Release 8, offered by International Business Machines Corporation, allows a coupling facility structure to be system-managed rebuilt without application intervention. This support has system code intercept the rebuild events and process them. The system-managed rebuild support deals with errors happening in between the rebuild phases. However, there is no externally supported interfaces for controlling the processing of the intercepted events. In order to facilitate the testing of this function, the TT is enhanced to intercept these system intercepted events and allow errors to be injected prior to the system processing the event. TT does this by modifying system code to route control to a TT module, which then calls testcase code with the exit parameter list to inject errors or verify information, and then route control to the system module that processes the intercepted events.

Further the z/OS operating system updates for system-managed duplexing rebuild require testcases to validate processing after the system code processes the internal event, but before the next phase of the system-managed duplexing rebuild. TT's event exit interceptor's code is thus changed herein (see FIG. 11) to allow control to be given to the testcase exit before and optionally after the system processes the event.

Figure 11:
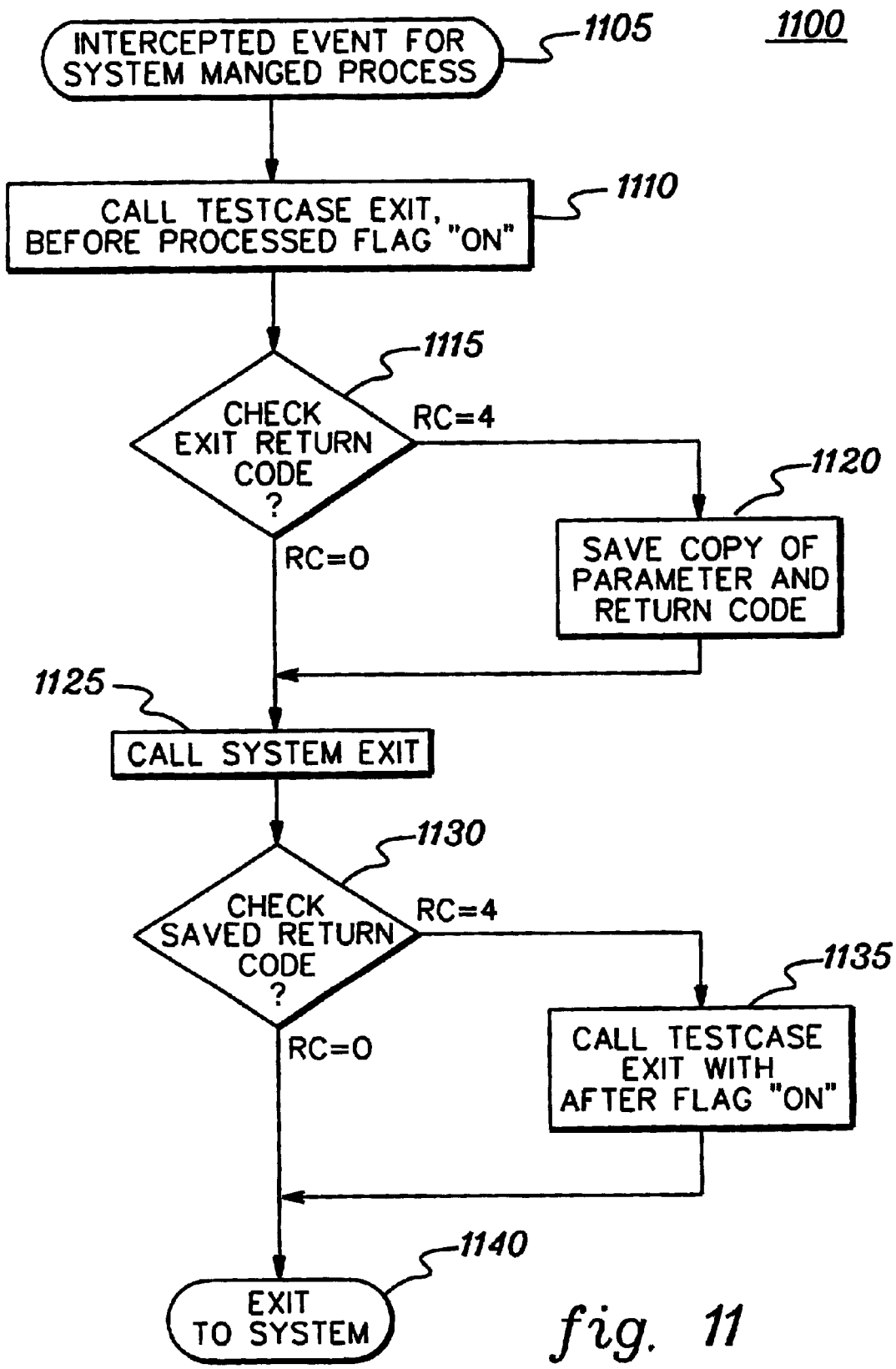
FIG. 11 depicts one embodiment of logic facilitating testcase control around internal system processing, such as an internal event exit interceptor for a system managed process, in accordance with an aspect of the present invention.

As shown by logic 1100 of FIG. 11, when TT's event exit interceptor interceptor's code gets control 1105, it routes control to a testcase exit 1110 with a bit set in the parameter list to indicate that the exit has been called prior to the system processing the event. The testcase code can optionally set a return code (RC) in the parameter list which indicates that control should be returned to the testcase exit after the system processes the intercepted event (e.g., RC=4). TT checks the return code from the testcase exit 1115 and saves an indication that control should be routed to the testcase exit after the system processes the event 1120, when the return code so specifies. TT then calls the system module that processes the event 1125. After control is returned to TT from the system module, TT checks the saved return code 1130, and routes control to that testcase exit again with a bit set indicating that the testcase exit code is being called after the system processed the event 1135. Thereafter, control returns to system processing 1140.

This additional support allows testcases to validate that the system code did the correct processing for the intercepted event. The support also opens additional windows where errors could be injected. This facilitates the testing of the error recovery code of the z/OS system.

TT Support: TEST_PHASE Variable

Testcases written by function test are used for regression testing not only by function test, but by the system test and engineering system test (hardware) groups as well. However, the execution environments for each of these three groups running the testcases is different. This conventionally meant that certain testcases needed to be modified by each group to deal with the differences in the environments. Individual testers also need to make sure that testcases that were not appropriate for particular environments were not sent to these groups. The management and maintenance of these testcases can be difficult. A way is thus needed to allow a testcase itself to detect and control execution based on the environment the testcase is being executed in.

A TT typically has a control file where defaults can be set. A new control statement is created to represent the execution environment, called TEST_PHASE. In one embodiment, TEST_PHASE has three settings, FCT (function test), SVT (system test) and EST (engineering system test). This environment variable is then checked by the testcase at execution time, and used to control testcase processing. For example, in a function test environment, the testcase may want to change the CFRM policy. It can thus check the TEST_PHASE variable and only change the CFRM policy if it is set to FCT. Each test group can set TEST_PHASE for their environment and not have to modify the testcases themselves. It allows a testcase to be coded so that it handles each environment such that at the time testcases are passed on to system test or engineering system test, each testcase does not have to be reviewed for the new environment. This saves all three test groups time that would otherwise be used reviewing and modifying testcases.

Figure 12A:
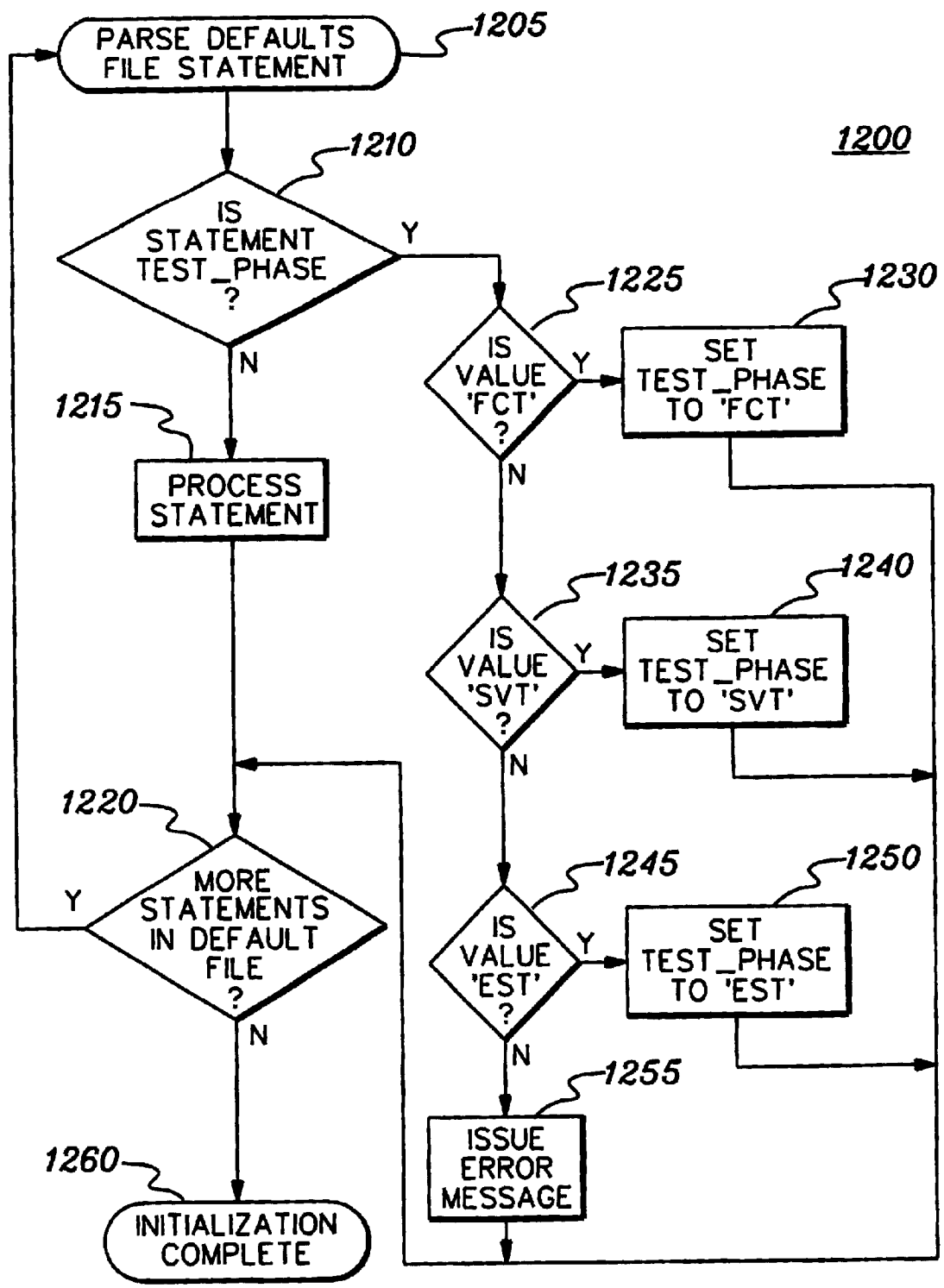
FIGS. 12A & 12B are one embodiment of logic associated with initialization and use of a TEST_PHASE variable employed by a testcase to understand a testing environment within which the testcase is to execute, in accordance with an aspect of the present invention.

FIG. 12A depicts one embodiment of logic 1200 for initialization of a TEST_PHASE variable. When the test tool initializes and processes the control defaults file 1205, it checks to see if the statement being processed is TEST_PHASE 1210. If "no", the statement is processed as appropriate therefore 1215, and processing continues if there are more statements to process 1220.

If the statement is TEST_PHASE, then the value is checked for "FCT" 1225. If "yes", the testcase accessible variable TEST_PHASE is set to the string "FCT" 1230. If the value is not "FCT", it is checked to see if the value is "SVT" 1235. If "yes", the testcase accessible variable TEST_PHASE is set to the string "SVT" 1240. If the value is not "SVT", it is checked to see whether it equals "EST"

1245. If not "EST", then an error message is issued 1255. If it is, the testcase accessible variable TEST_PHASE is set to the string "SVT" 1250. If there are additional statements to process 1220, processing continues. Otherwise, initialization is complete 1260.

Figure 12B:
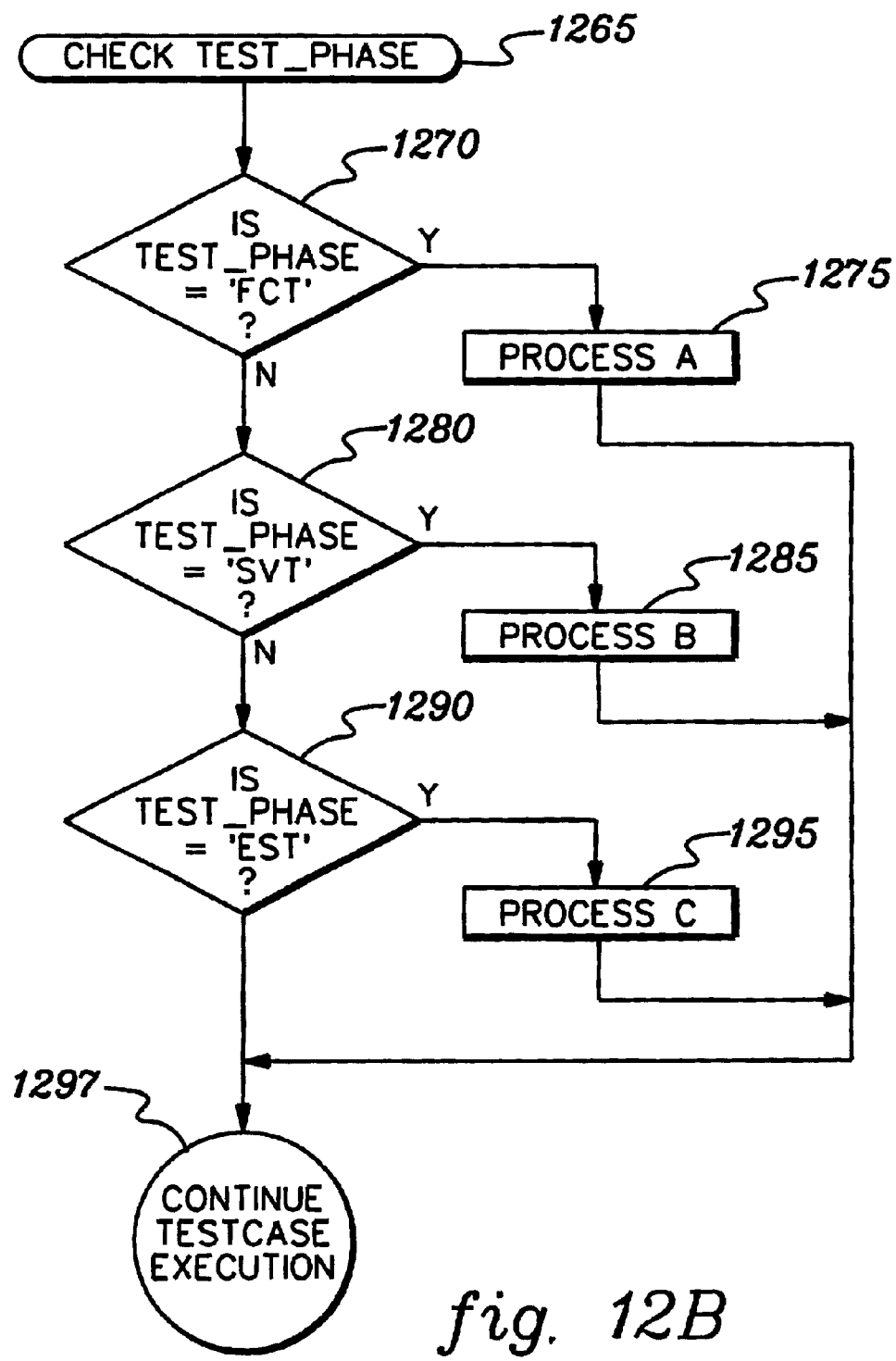

During testcase execution, the logic embodiment of FIG. 12B allows the testcase to check the TEST_PHASE variable, and based thereon to control processing of the testcase 1265. If the value of TEST_PHASE is "FCT" 1270, processing (e.g., process A) is performed specific to that environment 1275. If the value of TEST_PHASE is "SVT" 1280, processing (e.g., process B) specific to that environment is performed 1285. If the value of TEST_PHASE is "EST", processing specific to that environment is performed 1295. Thereafter, testcase execution continues 1297.

TT Support: Modifying Display Characteristic of Testcase Message(s)

TT testcases written by function test can contain multiple parts that each run on separate systems in a sysplex. Each of the multiple parts can issue its own success or failure messages. The messages are issued as normal write-to-operators (WTOs). As such, they normally appear on a system console in the same color as other normal system messages. If the TT testcase is a multiple system testcase, several success/failure messages are issued. If one part of a job fails, it might not be noticed by a tester, since messages often scroll off the screen. The way messages are handled in a sysplex could result in the tester seeing a success message for one part of a job after the overall testcase message was issued. This can cause testers to think that the whole testcase is successful, when in fact it failed, which can cause system problems to go unnoticed. A method of making the testcase success/failure messages more obvious to a tester is thus required.

A TT may have support for processing messages via an MPF (message processing facility) exit. The parameter list is mapped by the IEZVX100 mapping macro, which is described in an IBM publication entitled: "z/OS V1R1 MVS Data Areas", Vol. 1, GA22-7581, and which is hereby incorporated herein by reference in its entirety. It contains the CTXT (Comm Task Exit) parameter list.

Figure 13:
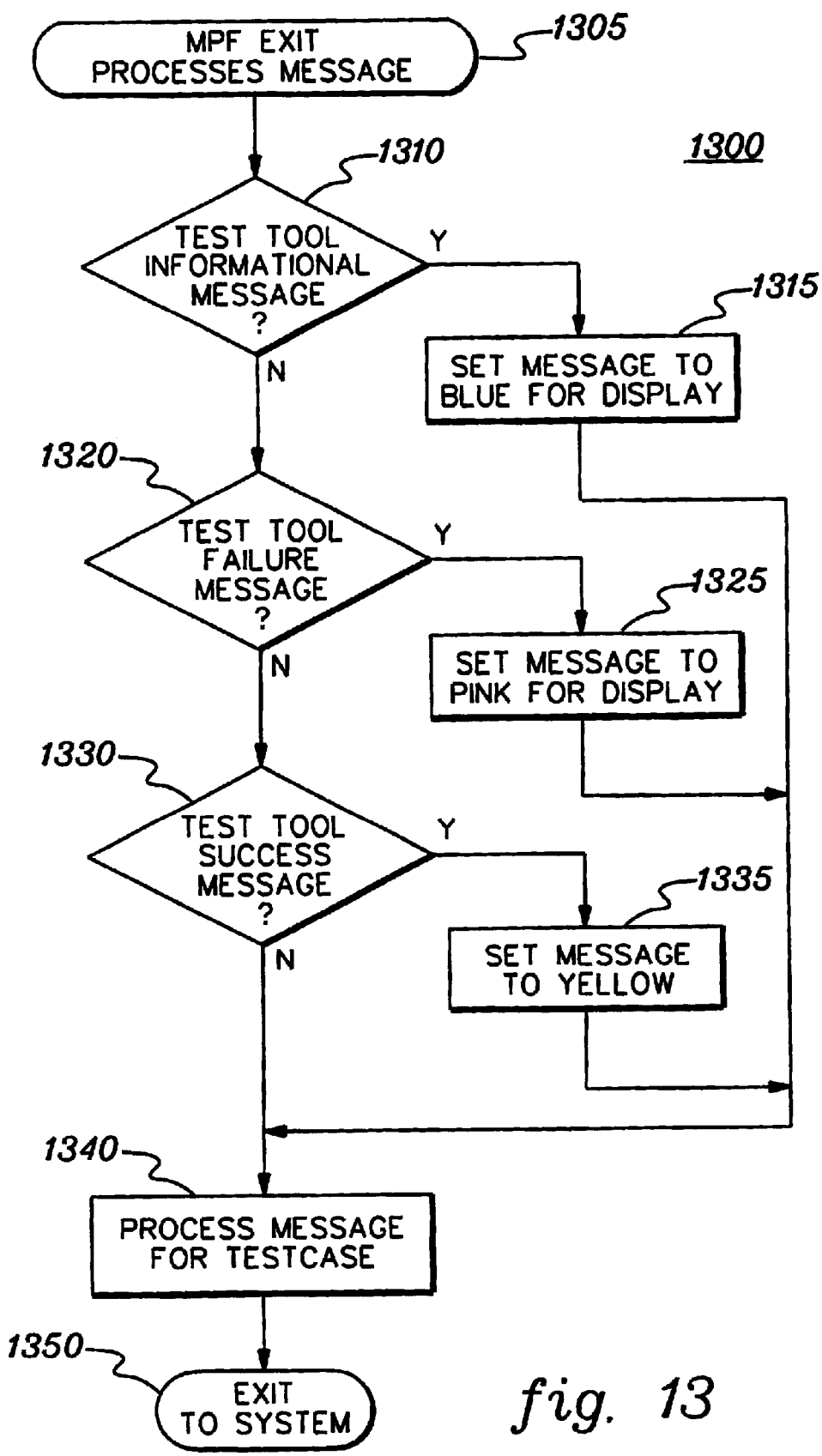
FIG. 13 depicts one embodiment of logic associated with test tool message processing wherein a display characteristic of one or more messages is modified, in accordance with an aspect of the present invention.

As shown by the logic embodiment 1300 of FIG. 13, if messages prefixed by TT are being processed by TT's MPF exit TTSMPFE 1305, it checks to see if the message is for a testcase having informational messages 1310, and if so, TT sets the CTXTEMCO bit (change message color control bit) and the CTXTBLUE bit in CTXT to set the message color to blue 1315. If the message is for a part of a job ending with a return code other than 0, or overall job return code other than 0 (indicating failure 1320), TT sets the CTXTEMCO bit (change message color control bit) and the CTXTPINK bit in the CTXT to set the message color to pink 1325. If the message is for a part of a job ending with return code zero or overall job return code 0 (success 1330), TT sets the CTXTEMCO bit (change message color control bit) and the CTXTYELO bit in CTXT to set the message color to yellow 1335. Thereafter, the message is processed if coded in the testcase to do so 1340, before processing exits to the system 1350.

By having TT change a display characteristic (e.g., color) of these messages, the status of the testcase is easily determined by the tester, which saves time in determining testcase status, or in identifying problems to be fixed, or informational messages to be evaluated.

TT System Name Mapping

TT testcases have the concept of a system id. This means TT will route that part of a testcase to the system with the matching system name, if it exists in the sysplex. If a system name does not exist in the sysplex, TT picks a system in the sysplex. Many testcases that are written by function test require one part of the job to run on a particular system in the sysplex, so the testcases are coded to the function test environment to allow that part of the job to run on the specified system. However, this means that if the testcase is to be run in a system test environment, each testcase would need to be modified to change the system id to match the required system in the sysplex it was running on. Since system test can have multiple sysplex environments to be tested, testcases would need to be changed on a continual basis and could not be run in more than one sysplex at a time. A way is thus needed to allow the testcase to be run on multiple sysplexes (i.e., different test environments) at the same time without modification.

Support is added to TT (component test tool) to allow a user to specify what a systemid maps to in a table. In one example, the table has the format of Systemid: Real system name and set up when TT is initialized or a job is submitted to update the table. There is one table per system in the sysplex.

Figure 14:
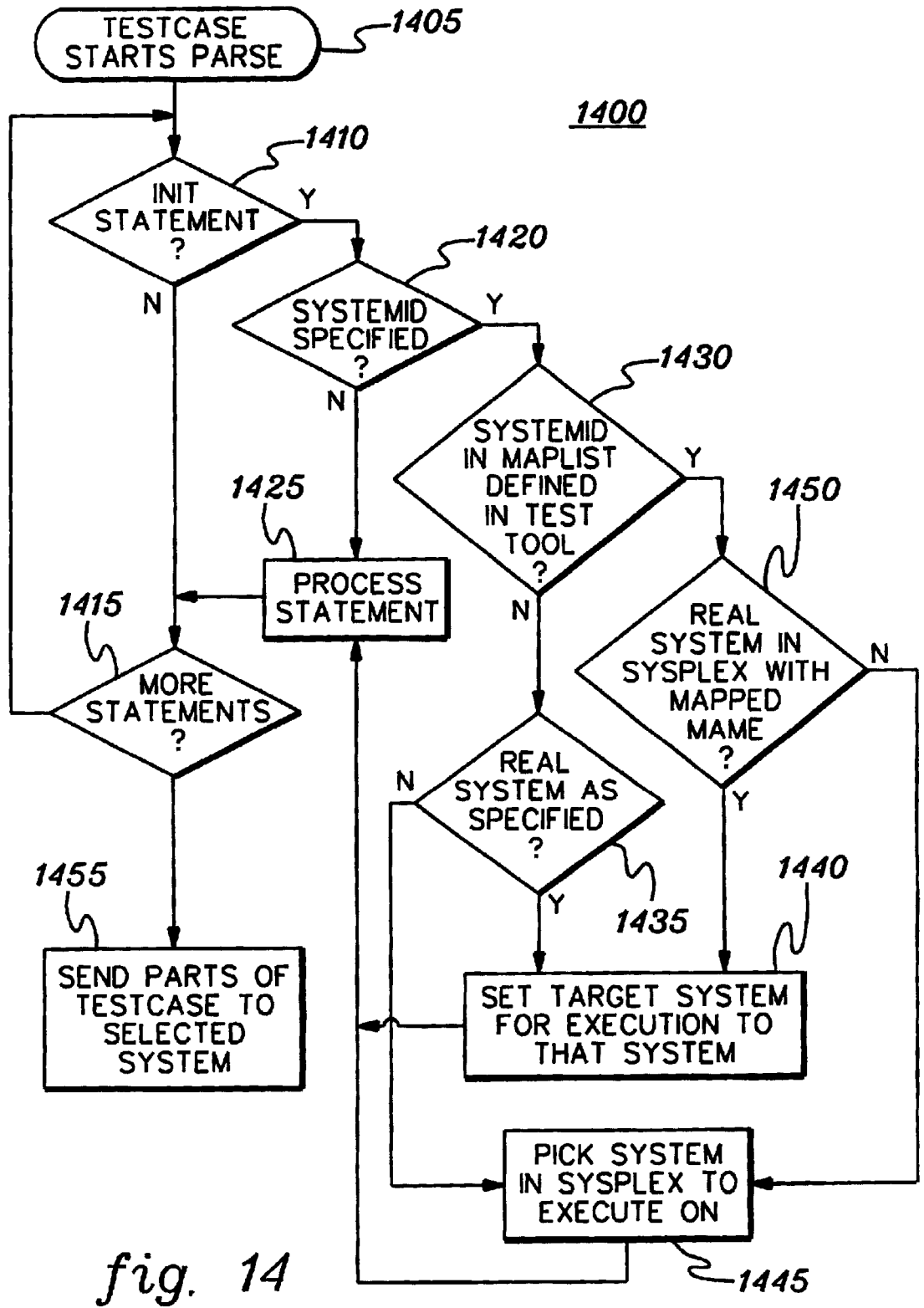
FIG. 14 depicts one embodiment of logic associated with test tool system name mapping at testcase parse time, in accordance with an aspect of the present invention.

As shown by the logic example 1400 of FIG. 14, when a testcase is submitted 1405, TT processes each statement in the testcase. If the statement is an INIT statement 1410, processing checks for the SYSTEMID keyword 1420. If the SYSTEMID keyword is specified, the value is compared to the entries in a system name mapping table 1430. If the value specified matches a value in the TT table, and a real system exists in the sysplex with that name 1450, TT indicates that this part of the testcase is to be executed on that system 1440. If there is no system with a matching name in the sysplex or the SYSTEMID is not in the mapping table, TT picks a system in the sysplex for this part of the job to execute on. It then processes the INIT statement 1425 and checks for additional statements 1415. Once all the input statements are processed, TT sends each part of the testcase to the appropriate system in the sysplex 1455.

This allows each unique system in a sysplex to have its own system name mapping table, and allows the same unmodified testcases to be executed in multiple sysplexes simultaneously without modification of the testcase source to select the controlling system in the sysplex.

TT Verbs

Updated system code in z/OS is to contain internal tables that need verifying for determining if a request issued to a coupling facility should be driven synchronously or asynchronously. A way is thus needed to verify that these tables are being correctly updated on a real system without requiring dumps of the system. For a system-managed duplexed structure, the external services would drive requests to both structures, or to the primary structure depending on the type of request. The system also validates that both parts of a duplexed operation obtain results which indicate that the structures are in a consistent state. A way is thus needed to verify the contents of the secondary structure without breaking duplexing between each request, and as well as a way to place the structure in an inconsistent state to test system code for this. New TT verbs, which are discussed below, are proposed for this.

XESXLFXR—The XESXLFXR verb uses internal system macros (i.e., IXLXLFXR, IXLXLFXT, & IXLXLFSR) to direct a coupling facility operation to one of the instances of a duplexed structure. It has support to read information from an instance of a coupling facility structure, update information in one instance of a coupling facility structure, deactivate duplexing in one instance of a coupling facility structure and/or to return information about the coupling facility itself. The z/OS code has the ability to direct operations to one instance of a duplex structure for its processing. XESXLFXR takes advantage of this function by using internal system macros to request commands be sent to a coupling facility. This allows the testcase to read only from a secondary structure of a duplexed pair of structures, instead of having to break duplexing so that external services could be used to verify the structure. It also supports a command to deactivate duplexing in one of the structures at a time or to make the contents of a pair of structures inconsistent with each other.

Figure 15A:
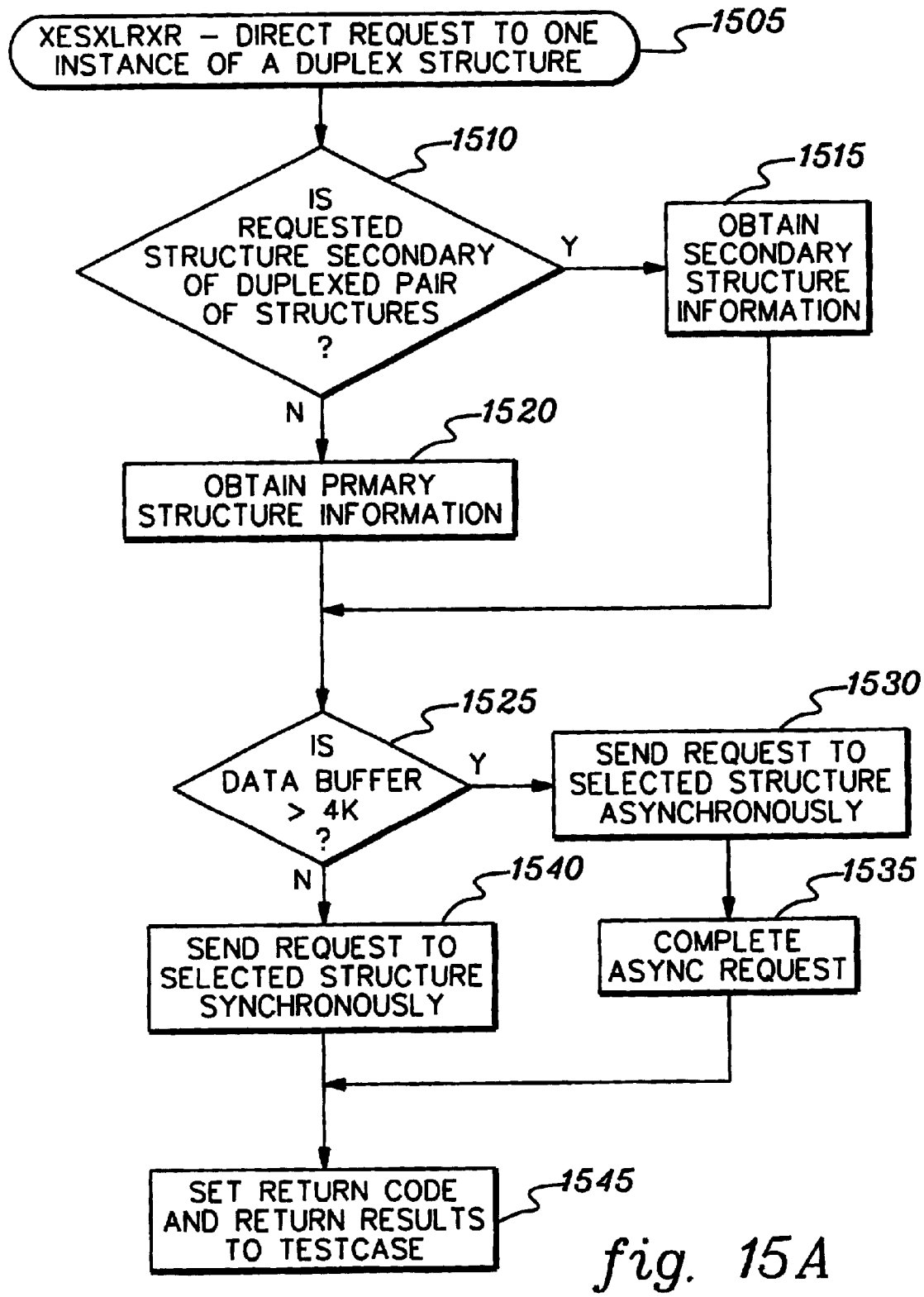
FIGS. 15A–15C depict one embodiment of logic associated with an XESXLFXR verb useful in directing a request to one instance of a duplexed structure, in accordance with an aspect of the present invention.
Figure 15B:
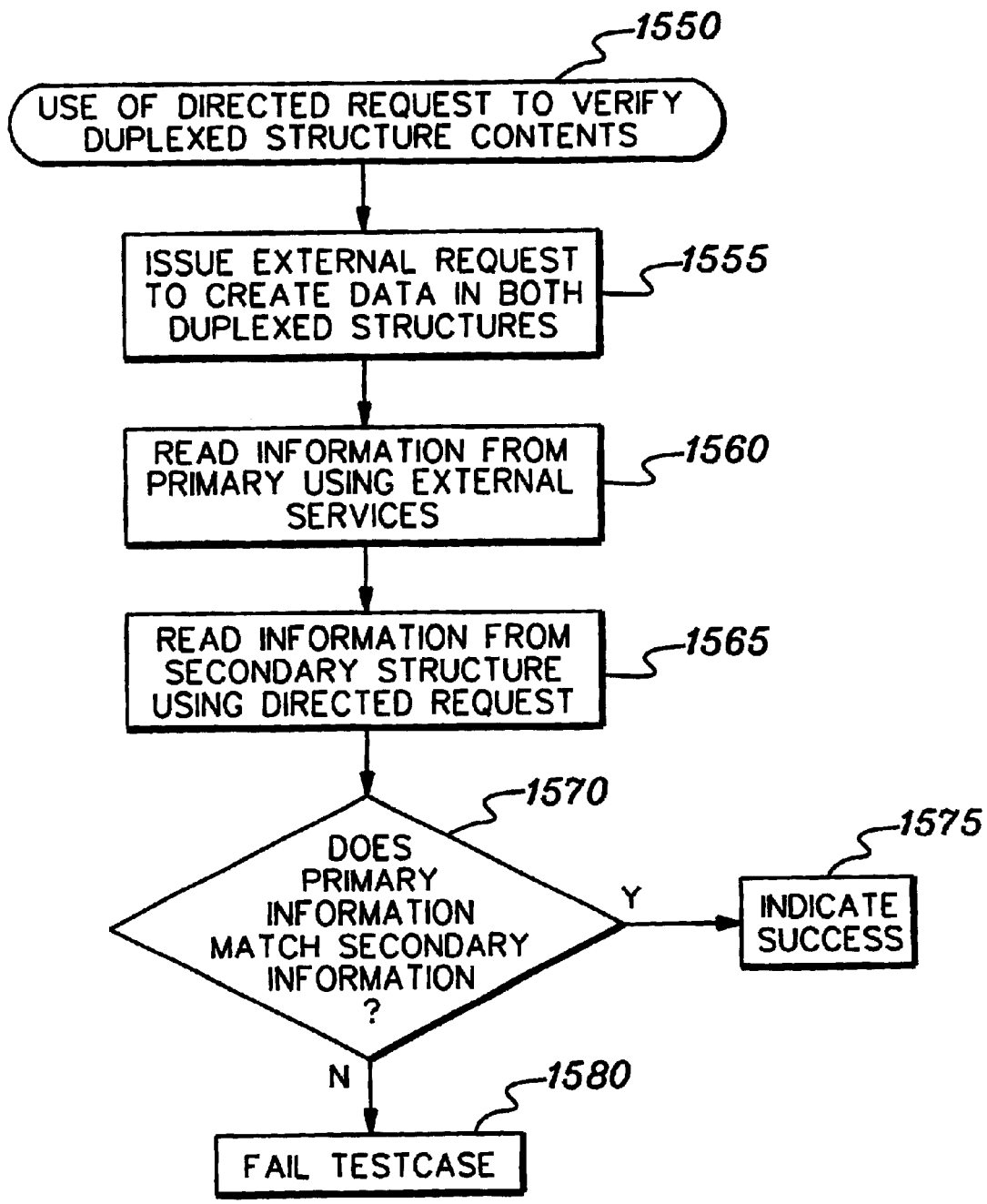
Figure 15C:
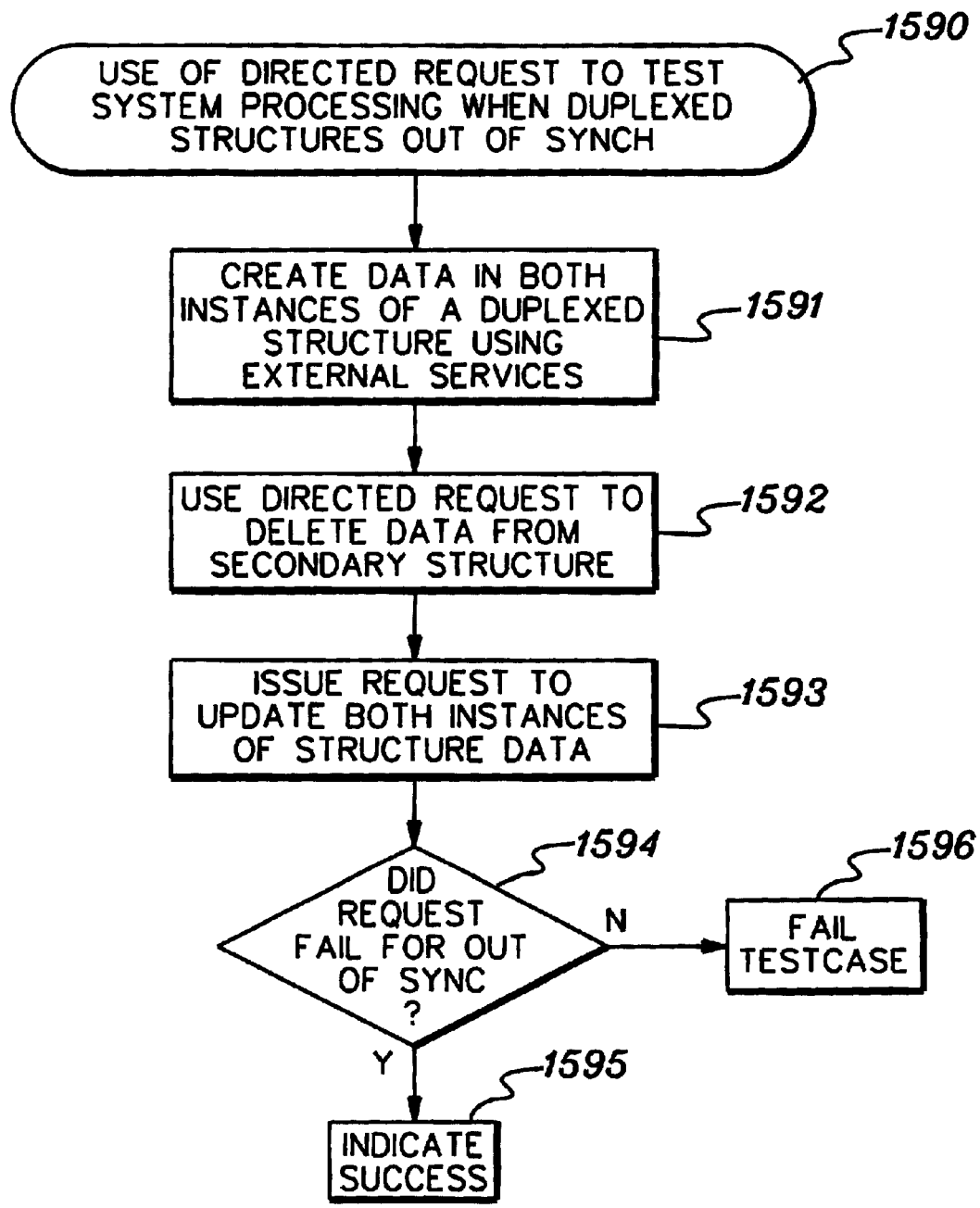

FIGS. 15A–15C depict one embodiment of XESXLFXR processing, generally denoted 1500. When a request for a directed coupling facility operation is issued 1505, processing checks to see if the secondary structure of a duplexed pair of structures is requested 1510. If "yes", then information about the secondary structure is retrieved from the system 1515. If "no", information is retrieved from the system about the primary structure 1520. Once the necessary structure information is retrieved, a check on the size of the data buffer for the request is performed 1525 in this embodiment. As one example, if the data buffer is less than or equal to 4K, the request is sent to the coupling facility for the requested structure instance synchronously 1540. If the data buffer is greater than 4K, then the request is sent to the selected coupling facility asynchronously 1530, and completion of the request is requested 1535. Once the request completes in either case, a request return code is set and results are returned to the testcase 1545.

The ability to direct a request to a specific instance of a duplex structure can be used to validate the contents of both structures 1550 (FIG. 15B). A testcase would issue a request that creates data in both instances of a duplex structure 1555. The testcase then reads the data from the primary structure using a system service read command (e.g., IXLLIST, IXLCACHE) 1560, and reads the data from the secondary structure using the XESXLFXR test tool request 1565. It then compares the information returned from the primary with the information returned from the secondary 1570. If data returned from both structures matches, an indication that the update was successful is returned 1575. Otherwise, the testcase is failed 1580.

The ability to direct a request to an instance of a duplexed structure can also be used to cause the contents of a pair of duplex structures to become different in order to test the operating system code that handles out of sync conditions for a duplexed set of structures 1590 (see FIG. 15C). The testcase would issue a request that creates data in both instances of a duplexed structure 1591. The testcase then issues a request to delete information from, e.g., the secondary structure using an XESXLFXR test tool request 1592. The testcase issues a request to update in both structures the data that was just deleted from the secondary structure 1593. The testcase then compares the response from the update request to see if the expected results indicate the duplex structures are out of sync 1594. If the results returned indicate that the structures are out of sync, notice that the test was successful is returned 1595. Otherwise, the testcase is failed 1596.

SASHSELL—This TT verb uses an internal macro (IXLCMFCT) to find and return a pointer to the actual system heuristic cell for the requested opcode and type (simplex/duplex) and buffer size. This allows testcases to self-verify that the heuristics table data for a synchronous request to the coupling facility is being properly updated.

XESDMPSR—This TT verb allows a testcase to use internal system services (IXCDSR & IXLXLFMR) to cause dump serialization on a coupling facility structure. Existing support can obtain dump serialization on both instances of a system-managed duplexed structure. The updates to this verb allowed dump serialization to be obtained and released on the primary, secondary or both structures. This allows testcases greater control over which requests to a duplexed structure are to see dump serialization.

ERROR—Testcases are written to a defined standard which includes checking the environment that the testcase is executing in. If the environment is not sufficient for the testcase to execute successfully, it is terminated with a specific return code X (e.g., X=8). In a sysplex environment, a testcase executing on multiple systems in the sysplex needs to check the environment on each system and set a return code for the part of the testcase executing on that system. Pre-existing test tool support did not stop processing for environmental errors, so if only one part of the multi-system testcase failed environment checking, the parts of a testcase on other systems did not terminate. Thus, a way is needed to terminate an entire testcase (e.g., with a return code 8) when one system does not have a sufficient environment.

The ERROR verb is updated herein to have a new ENVIRONMENT keyword. This causes all parts of a TT testcase to terminate with a return code 8 (i.e., a testcase standard return code for environment error). Prior to this support, each part of a multi-system testcase needed to do its own environment checking and terminate its piece of the testcase. If only one system failed the environment check, that part of the testcase would terminate and the remainder of the job would hang. The logic disclosed herein causes all parts of the testcase to automatically terminate when the ERROR verb is invoked with the ENVIRONMENT keyword.

Figure 16A:
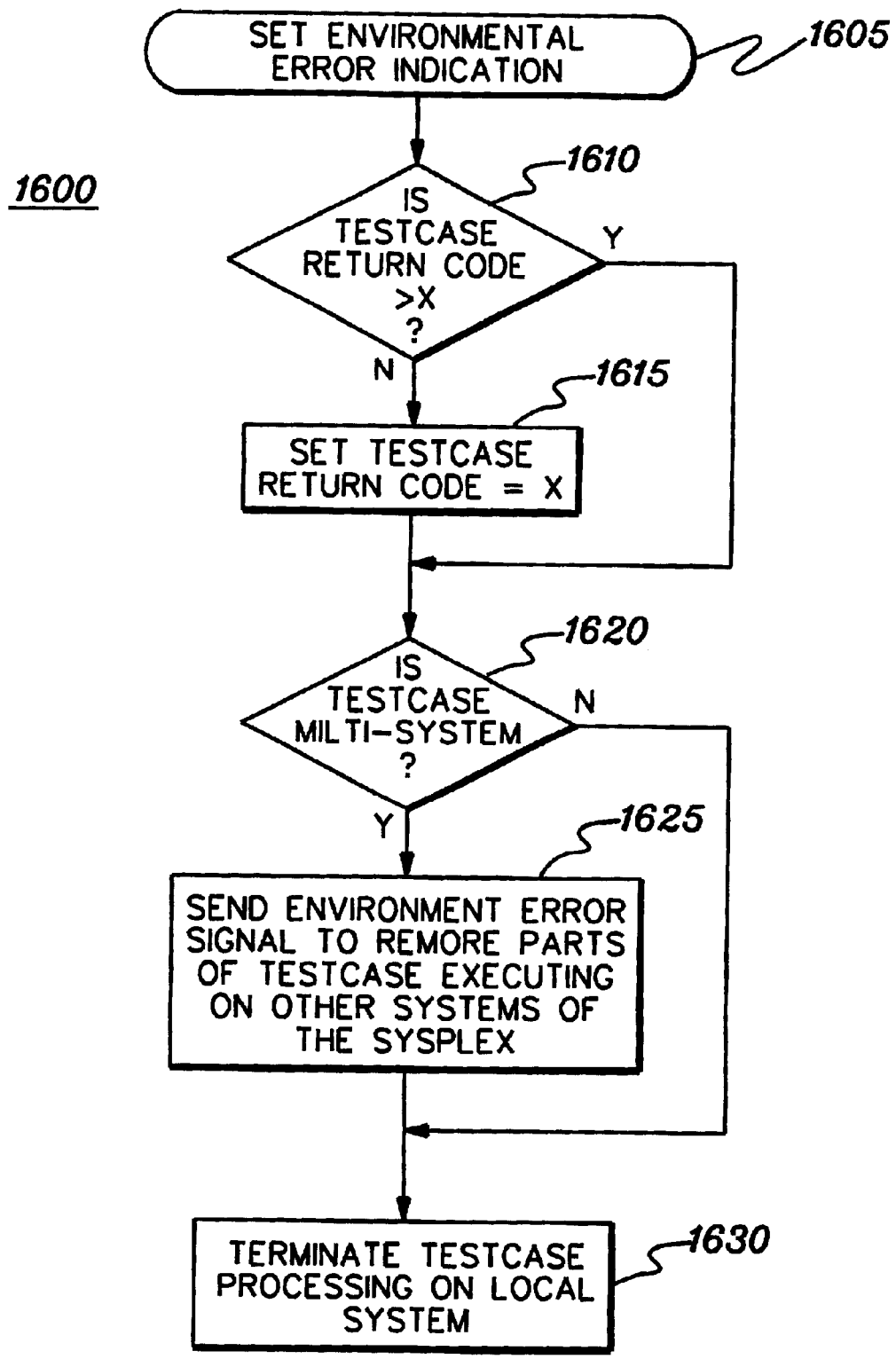
FIGS. 16A & 16B depict one embodiment of logic associated with an ERROR verb useful in processing an environment error indication between multiple systems executing a testcase, in accordance with an aspect of the present invention.

One embodiment of local processing 1600 for an error environment is depicted in FIG. 16A. When the ERROR environment statement is executed, an indication the testcase is terminating for environmental reasons is saved for diagnostic purposes 1605. The local testcase return code is then checked to see if it is greater than X, wherein X represents an environmental error (e.g., X=8). If "no", the testcase return code is set to X 1615. Once the local testcase return code is greater than or equal to X, a check is made to see if the testcase is a multi-system testcase 1620. If so, a signal is sent to the remote parts of the testcase executing on other systems to terminate all portions with a return code X 1625. The local processing of the testcase is then terminated 1630.

Figure 16B:
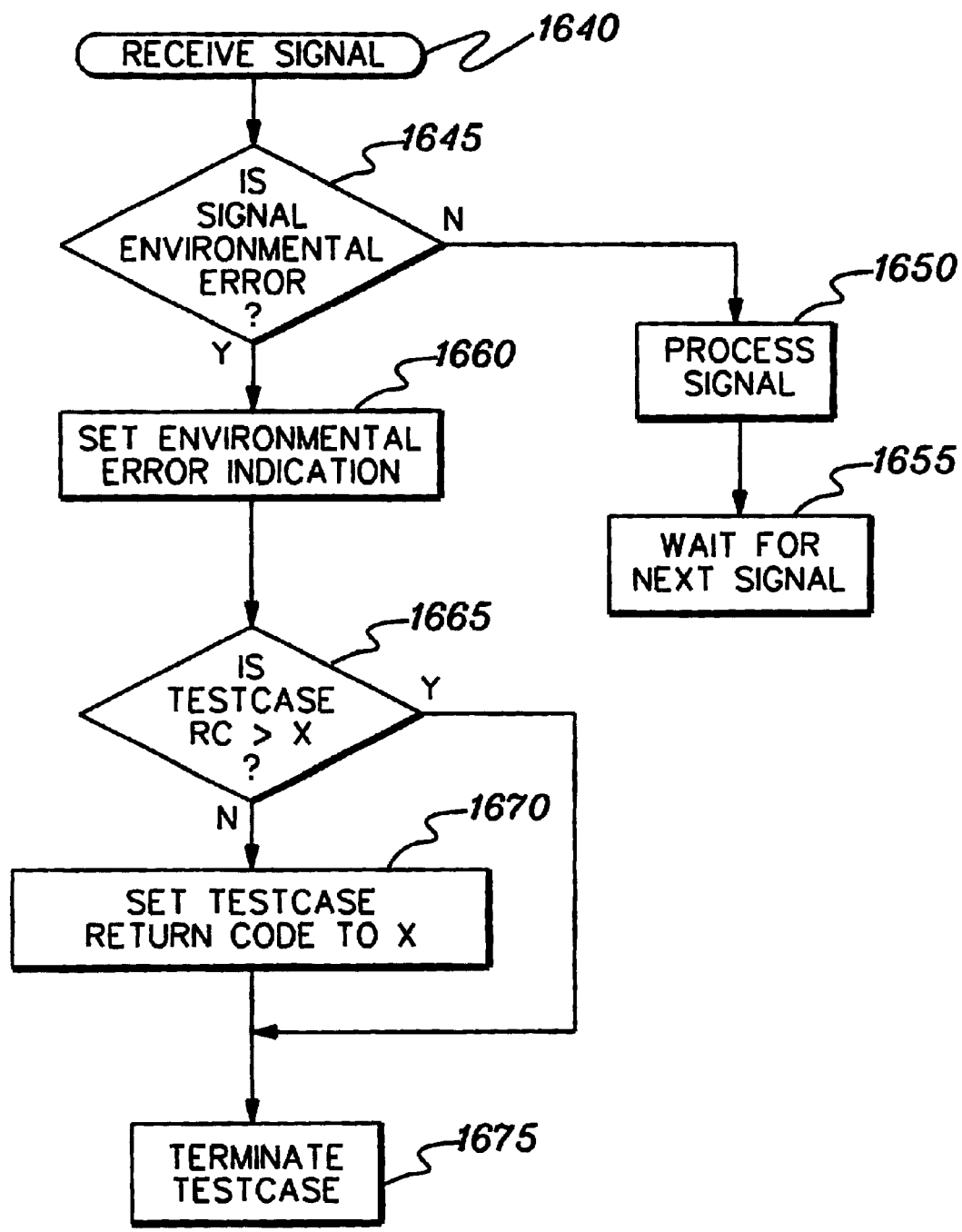

An example of remote processing for an error environment signal is depicted in FIG. 16B (i.e., processing on a system remote from the environmental error). When a remote part of a testcase receives a signal from another part of the testcase 1640, it initially checks to see if the signal is an environmental error signal 1645. If "no", it processes the signal 1650 and waits for the next signal 1655. If the signal is an environmental error signal, an indication that the testcase is terminating for environmental reasons is saved 1660. If the local testcase return code is not greater than X 1665, the local testcase return code is set to X (e.g., 8) 1670, and the testcase is terminated 1675.

TT Testcase Macros

Testcases to be created for system-managed duplexing should have many of the same code written for validating environments and correct executions. A set of TT macros have thus been created to allow a large portion of the common code to only be coded once. There are testcase standards that each testcase must conform to, such as setting a return code of 8 when the environment the testcase is running in is not sufficient to allow the testcase to execute.

The macros are:

DUPLXTST—This macro sets up and validates an execution environment, provides testcase serialization and detects certain errors at execution time. It provides serialization by issuing ENQ macros on three resources to serialize: the CFRM policy, testcases that must execute without any other testcases and testcases that cause a loss of connectivity to the coupling facility. A CFRM policy job and policy name can be specified to optionally run a job to define CFRM policy and start the specified CFRM policy if it is not already started when executing in a function test environment. It validates the system supported level of the coupling facility, the CFLEVEL of the connected coupling facilities, the minimum and maximum number of coupling facilities available to the system, the duplex keyword in the CFRM policy of the structure the testcase uses, and the minimum and maximum number of coupling facilities with coupling facility to coupling facility connectivity. If any of these checks fail, the testcase is terminated with an environment error.

It further checks for coupling facilties that are offline and fails the testcase if it cannot tolerate offline coupling facilities with an environment error. It is also possible for the system to experience an error in processing, but be able to recover from it such that the testcase might not notice. In these cases the system issues an IXC573I message. The DUPLXTST macro generates code to monitor the system for these messages and fails the testcase if one appears unexpectedly by doing the following:

1) testcase return code is set to indicate failure,
2) an sdump will be taken, and
3) test tool processing will be terminated.

Once the testcase completes execution, DUPLXTST will restore the CFRM policy back to the policy that was active if it had changed it when the testcase started. It also provides testcase execution sync points at startup and cleanup time to make sure all parts of a job that execute on multiple systems start and end without interfering with each other.

STRPHASE—This macro issues an IXCQUERY for the specified structure and validates that the structure is in the expected phase of a system managed process. It provides the ability to retry the IXCQUERY if the phase is not yet at the expected phase. If the rebuild phase does not match that requested, the macro does the following:

1) testcase return code is set to indicate failure,
2) an sdump will be taken,
3) the current PARMLIST will be displayed, and
4) test tool processing stops for the current workunit.

CHKCFSTR—provides the ability for a testcase to use the XESXLFXR verb to verify that the connector to the structure or the structure itself has been properly cleaned up in the coupling facilty. The current set of external services does not provide this capability and there is no way for a testcase to verify this. There may be problems in the system code where this is not being properly cleand up. Using the XESXLFXR TT verb, this macro provides an option that will save information necessary from the coupling facility prior to a request to disconnect or deallocate the structure in the coupling facility. After the coupling facility should have cleaned up, a verify option of the macro can be invoked to check the coupling facility for the existence of the resource that should have been cleaned up. If the resource was not cleaned up, the macro does the following:

1) testcase return code is set to indicate failure,
2) an sdump will be taken, and
3) test tool processing will be terminated.

SETSASHT—This macro returns the contents of a field of an internal control block to force the next request to be issued synchronously to the coupling facility. See TT SYNC switch for detail on how this works.

LOCKSYNC—This macro sets a bit or field in an internal control block to cause subsequent externally issued requests to the coupling facility to be processed synchronously, asynchronously or let the system decide. This gives testcases control over individual requests using the same fields in the internal control block that TT's Sync and Async switches use.

WHENMSG—In a sysplex environment, a process started at one system in a sysplex may complete and issue a message on another system in the sysplex. If a testcase starts a process and needs to wait for the process to complete, it may have no way of knowing which system in the sysplex is going to complete the process. This traditionally requires testcases to have knowledge of the environment. A way is thus needed to provide multi-system testcases with the ability to find a message on any system in the sysplex. If processing on any of the systems in the sysplex has problems, it would issue a message indicating that problems have happened and attempt to recover. A way to detect these errors and cause the executing testcase to fail if an error is encountered is also needed.

The WHENMSG macro is preferably created with several options that allow each part of a testcase running on a system in a sysplex to code options that will allow a message with a text stream within it the following options: (1) allow the initiating system to wait for a message issued on any system, (2) call testcase code on the system the message was found on (3) take an SVC dump or (4) fail the testcase. To accomplish this, there are three request options on the macro, i.e., SETUP, CLEANUP and WAIT. Request SETUP processing activates the message processing then creates a task to process the message and take the requested action of POST, CALL, DUMP, or FAIL. Action POST resumes option WAIT. Action CALL invokes testcase code. Action DUMP causes a diagnostic dump to be taken. Action FAIL terminates the testcase. An option SEARCHTEXT can be specified to further qualify the message being found. Request CLEANUP processing requests the attached task to terminate, detaches the task and deactivates the message processing facility for the message. Request WAIT processing waits for a signal to be received indicating that the message has been issued.

Figure 17A:
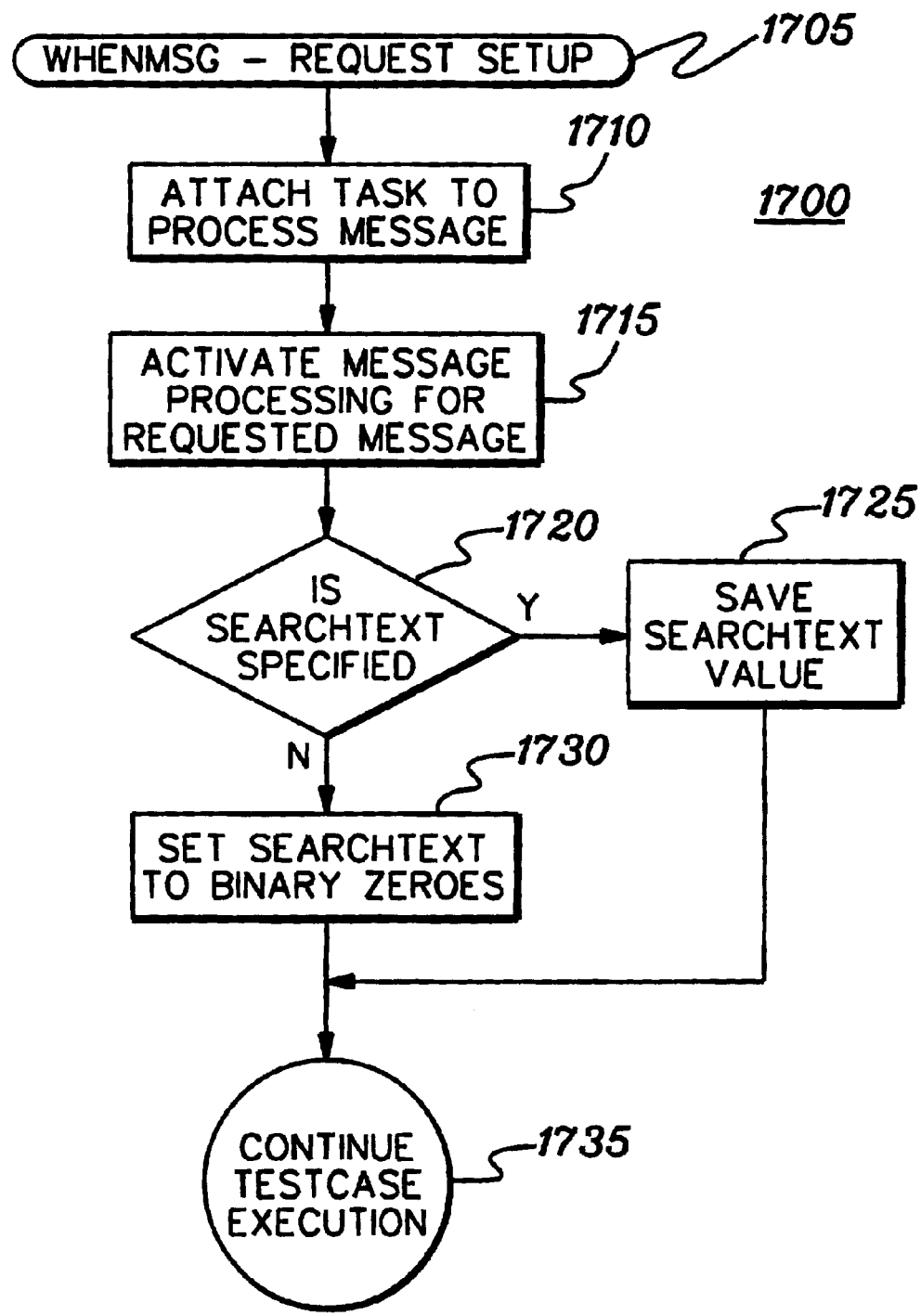
FIGS. 17A–17D depict one embodiment of logic associated with a WHENMSG macro which provides a multi-system testcase with ability to find a message on another system in a sysplex, in accordance with an aspect of the present invention.

Logic 1700 of FIG. 17A depicts one embodiment of REQUEST (SETUP) logic. When invoked, it attaches a new task that will process when the requested message is found 1710. Processing then activates the message processing facility for the request message 1715. If the optional SEARCHTEXT was specified 1720, the value is saved for the attached task to use to qualify the message found 1725. If SEARCHTEXT was not specified, the SEARCHTEXT string is set to binary zeros 1730, after which testcase execution continues 1735.

Figure 17B:
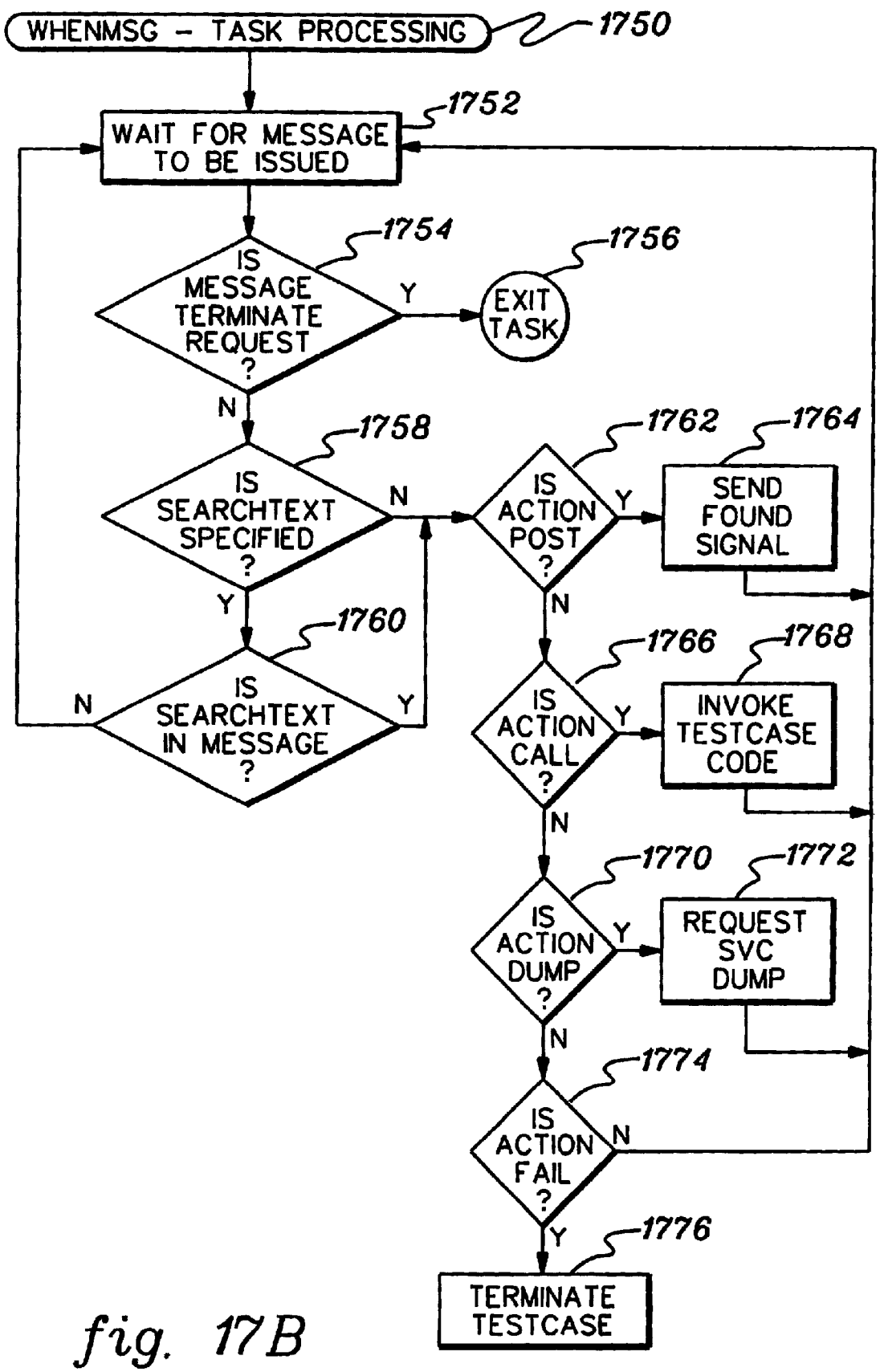

One embodiment of task processing 1750 is depicted in FIG. 17B. The attached task waits for the message processing facility to find the requested message 1752. When the message is found by the system message processing facility, it resumes the task. If the message is a request to terminate 1754, the task ends 1756. Otherwise, the task checks to see if SEARCHTEXT is binary zeros 1758. If "no", or if the SEARCHTEXT string is found within the message being processed 1760, the message is considered a match and the action requested is taken. If the action is POST 1762, a call is sent indicating the message is found to all systems 1764. If the action is CALL 1766, code within the testcase is executed 1768. If the action is DUMP 1770, an SVC dump is requested from the system 1772. If the action is FAIL 1774, the testcase is terminated 1776. For actions POST, CALL and DUMP, or if the SEARCHTEXT was not found in the message, the task will wait for the next instance of the message to be issued 1752.

Figure 17C:
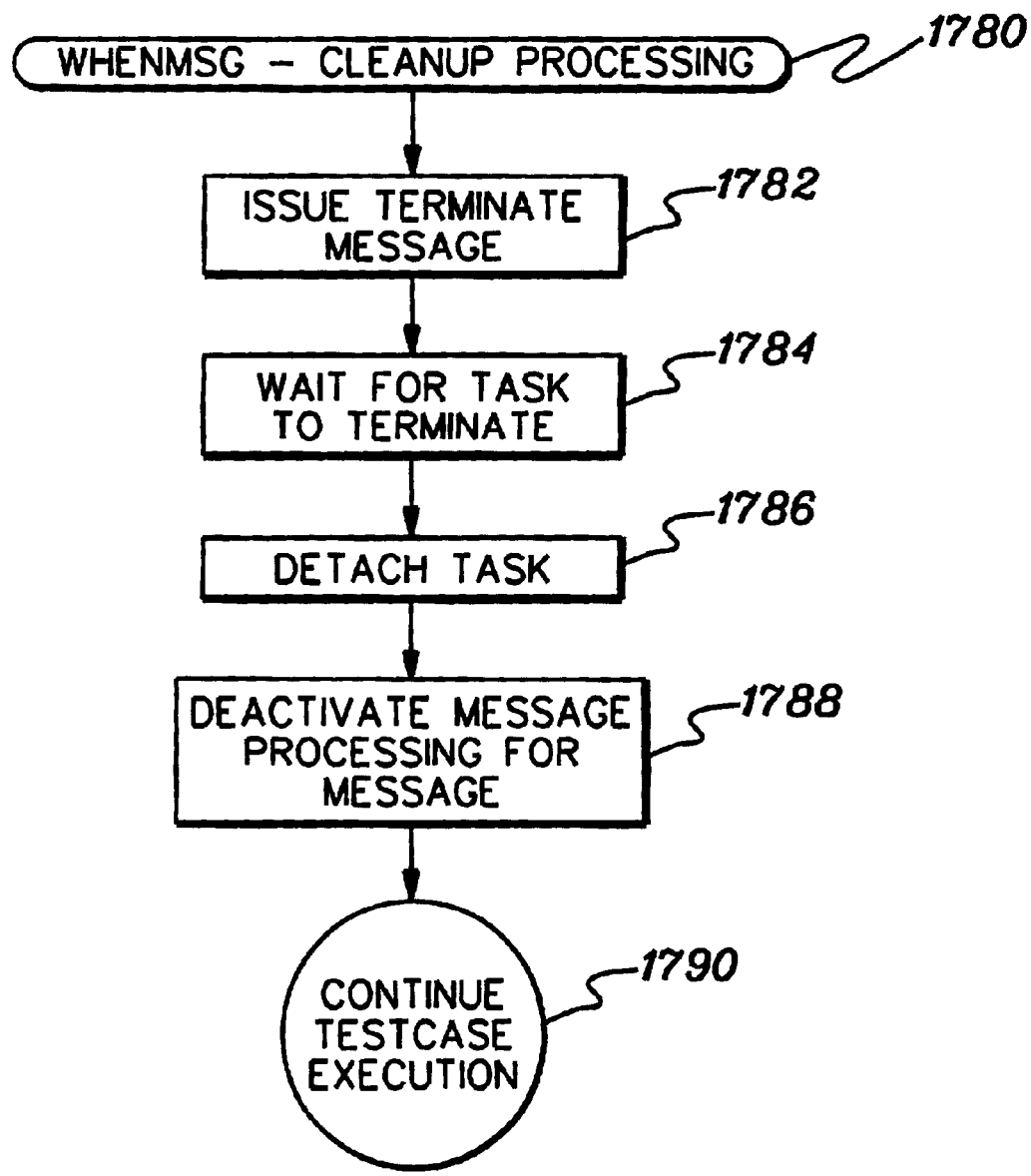

FIG. 17C depicts one embodiment of logic employed when a request CLEANUP is issued 1780. Processing initially terminates the processing 1782 and causes the task to end. It then waits for the task to terminate 1784, and detaches the task 1786, before deactivating the message processing for the requested message 1788, and continuing testcase execution 1790.

Figure 17D:
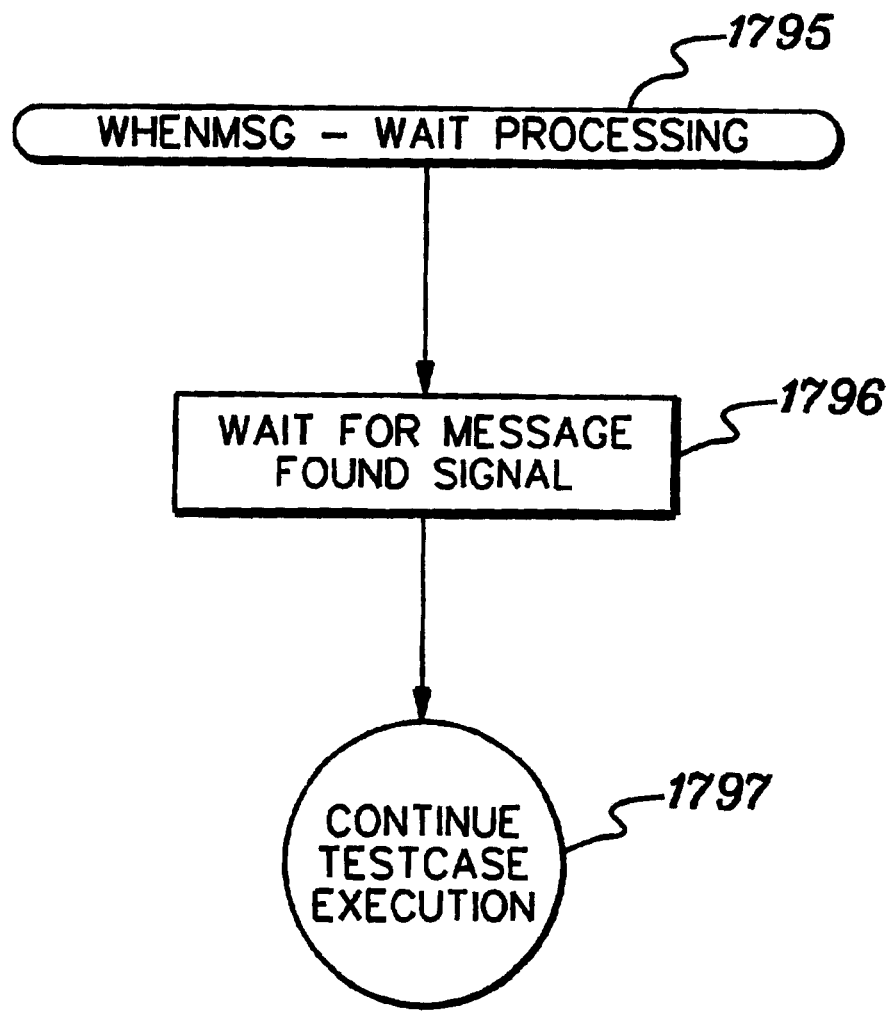

FIG. 17D depicts one embodiment of logic for processing a request WAIT message 1795. When a REQUEST (WAIT) is issued, it waits for the message found signal to be sent from the task 1796. Once the signal is received, the testcase continues execution 1797.

QCFLINK—If the testcase is running on a VICOM system, it issues commands to VICOM to retrieve information about the coupling facility-to-coupling facility links currently in use. It returns to the testcases the userids of the coupling facility and information about the channel paths being used for coupling facility-to-coupling facility connectivity and the type of each path (sender/receiver).

MOVESTRS—This macro can be used to get a structure or a set of structures into a particular set of coupling facilities. This works for both simplex and duplex structures. The intent of this macro is to make testcases more flexible by being able to accommodate a wider set of policy and coupling facility configurations. The idea is that a loop is made that invokes a REQUEST(NEXT) each time and moves to the next configuration of structures in the coupling facilities. It can be useful when trying to get structures into coupling facilities with a certain position in the preference list. It is up to the issuer of the macro to make sure that a structure has completed a transition by observing events in connector event exits, monitoring messages, or listening to enfs. MOVESTRS will move exactly one of the structures listed on the STRNAME parameter on each invocation of the MOVESTRS REQUEST(NEXT) invocations. MOVESTRS will end the testcase if it believes it has exhausted all possible combinations of structure configurations. The return code with which the testcase ends can be specified with the RETCODE parameter.

RCRXMAC—This macro (which is described further below in connection with FIG. 18) uses the DUPLXTST and RCRXVER macros as well as system services (i.e., IXCQUERY, IXLCONN, IXLLSTC & IXLLSTE) to set up and validate the environment and perform operations to the primary, secondary or both list structures of a system managed duplexed pair of structures, and validate the results, and start and stop system managed duplexing.

RCRXVER—This macro is invoked by RCRXMAC to verify ixllist operations. RCRXVER encapsulates a simulation of a list structure. It uses an array of list entries and chains the entries in primary and secondary order. Entries can be created, moved, read, and deleted. Entry data, adjunct data, list controls, and list entry controls are kept in local storage to represent the list structure. RCRXVER verifies that:

1) The real list structure is correct by comparing its local copy of the list structure with the real list structure, entry by entry, for both primary and secondary key order (when refoption=key) or by name (when refoption=name).

2) The answer area is correct after each individual list operation is performed.

3) The correct locks are held, when the list structure supports locks.

4) List monitoring is correct, by maintaining EMC information and comparing it against the real structure.

If validation fails, the RCRXVER does the following:

1) testcase return code is set to indicate failure, 2) an sdump will be taken, and 3) test tool processing will be terminated.

Returning to the RCRXMAC macro, the standard testing process used to test and validate a list structure function in a coupling facility (CF) requires each testcase to be uniquely coded with data variables to contain data and status information used during the update step, and uniquely coded with instructions to read the list structure contents and to perform the comparison as uniquely determined by the specific updates that were made to the list structure. With duplexed list structures, an additional type of testing is required to force the list structures to recognize certain out-of-sync error conditions by purposely updating each of the two structures with different content. This increases the amount and complexity of the unique data variables and code required in each testcase to properly verify not only the final results of the list structure updates, but also of intermediary results to verify that an out-of-sync condition has been properly established prior to the stimulus that will lead to the recognition by the list structure of the out-of-sync condition. The additional complexity notwithstanding, some method is needed to simplify the verification step such that each testcase can be coded without the unique data variables and unique verification code.

Figure 18:
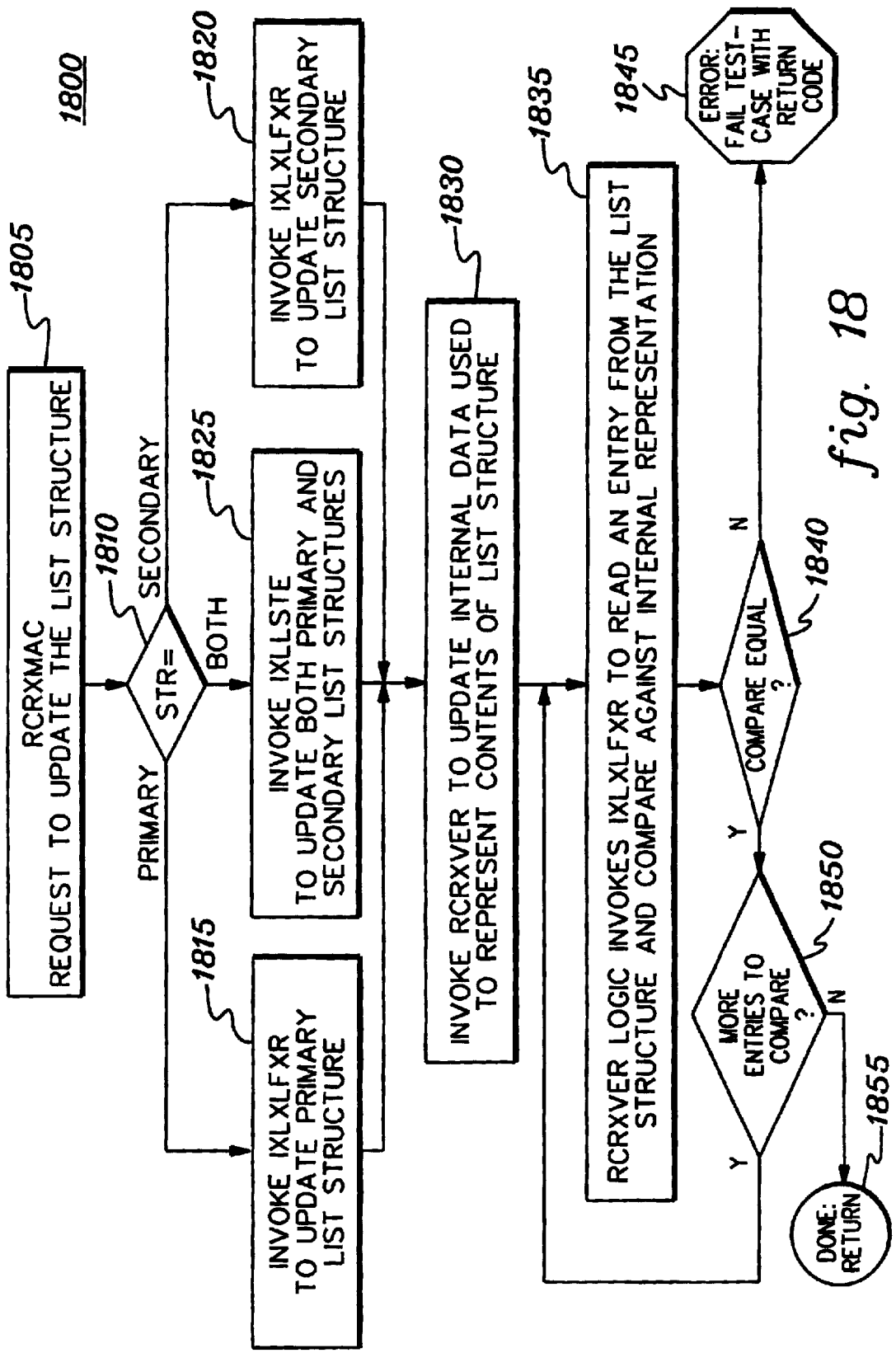
FIG. 18 depicts one embodiment of logic associated with a RCRXMAC macro in accordance with an aspect of the present invention.

The RCRXMAC and RCRXVER macros allow a testcase to be coded to update both simplex and duplexed list structures without requiring unique data variables and verification code to verify the list structure contents. This is accomplished by encapsulating within RCRXMAC and RCRXVER a general set of data variables and verification code that understands the architectural characteristics of the list structure and, by intercepting each update made to the list structure, incorporates those updates within its own set of data variables (herein also referred to as the simulated computer structure), and then performs a complete read of the list structure contents to compare against its own set of data variables to verify that the contents and status match in every detail FIG. 18 shows one embodiment of process logic 1800 performed by RCRXMAC, using in part RCRXVER.

An RCRXMAC request is issued in the testcase to update the list structure contents 1805. The request can specify that a list entry be created, moved, updated, read, or deleted. The request can specify whether the update is to be made to the primary structure only, to the secondary structure only (if the list structure is duplexed), or to both the primary and secondary structure (again, if duplexed).

Logic then determines whether to update the primary, secondary, or both structures as requested on the RCRXMAC invocation 1810. If only the primary list structure is to be updated, an IXLXLFXR invocation is made to update the primary structure 1815, or if only the secondary structure is to be updated, and duplexing is active, an IXLXLFXR invocation is made to update the secondary structure 1820. If both the primary and the secondary structure are to be updated, an IXLLSTE invocation is made to update both the primary and secondary list structure 1825. The IXLLSTE request will update only the primary list structure if duplexing is not active.

RCRXMAC logic next invokes the RCRXVER function to update the internal data variables within the RCRXVER environment 1830. These internal data variables are updated to internally represent the expected content of the list structure based on the known architectural behavior of the list structure and based on whether the primary, secondary, or both the primary and secondary list structures were updated. Note that the internal data variables may not change if, for example, the expected result of the request is that it will be rejected or ignored because of a condition that had been previously and purposely established by the testcase during processing of an earlier RCRXMAC invocation This feature is both valuable and unique in that the processing history of the list structure is maintained within the internal variables, thus alleviating the testcase of the need to maintain this history.

The RCRXMAC logic subsequently invokes the RCRXVER function to verify the contents of the list structure by comparing the contents against the expected contents saved in the internal data variables 1835. This is accomplished by reading each list entry from the list structure one entry at a time and comparing the list entry data and control information with the expected values contained in the internal data variables 1840. The primary list structure is processed first and, if duplexing is active, the secondary list structure is processed. This read and compare function is an aspect of this invention because the entire set of data and control values associated with each list entry, and with each set of list entries, and with both the primary and secondary list structure are verified, thus alleviating the testcase of the task of understanding the architectural behavior and all of the associated data and control values that change from one update to the next. Each testcase can thus focus on performing the high level functions and test special interactions by making several invocations of the RCRXMAC function, and each invocation will automatically perform all of the list structure data and control verification for the testcase.

If the comparison 1840 is not equal, the testcase is appropriately failed with a return code to indicate the nature of the problem 1845. If the comparison is equal, processing moves on to evaluate whether all entries have been processed 1850. If more entries are to be processed, processing returns to read and compare the next list entry 1835.

If all entries have been processed, logic returns control to the testcase 1855. Thus, invocation of RCRXMAC/RCRXVER is complete, all list structure updates have completed successfully and the internal data variables now reflect the current contents of the list structure. The testcase may now invoke RCRXMAC again with a new update request and the process will start again from the top.

The full scope of the RCRXMAC and RCRXVER functions can include additional facilities that allow a testcase to establish special conditions within a primary and secondary list structure in order to test out-of-sync conditions, monitoring events, and lock contention and sequencing conditions.

One aspect of this invention is the automatic verification of list structure data and control information for both simplex and duplexed list or cache structures. A testcase can be written to do one set of RCRXMAC invocations against a simplex structure, and then minimally modified to perform the same set of RCRXMAC invocations against a duplexed structure without needing to write any of the verification code. Also, an existing testcase using the RCRXMAC functions can be easily enhanced to add more RCRXMAC invocations to do additional list structure operations, again without needing to understand the architectural behavior of the list structure and without needing to write any verification code. Additionally, the RCRXMAC functions can be readily extended to testing cache structure operations if desired.

Model Testcases:

The concepts disclosed herein can facilitate an early system test of managed duplexing code. Such a system test can be performed before all the code is written and tested. In order to ensure stability of the driver, function testing needs to make sure that the system functions properly when stressed with requests to duplex structures.

In order to accomplish this, a set of testcases can be assembled that uses list structures, lock structures and cache structures (the three structure models) to simulate an actual application using system managed duplexed structures. The testcases can be set up with a task to handle all the expected events that could be presented to a connections event exit. If a testcase could not connect to a structure, it sets up an ENF 35 listen exit to look for ENF 35 events for the structure it was attempting to use, and would then retry to connect to the structure. Additional tasks can be attached to drive requests to the structures. These tasks can issue patches of requests, covering the different request types of IXLCACHE, IXLLOCK and IXLLIST/IXLLSTC/IXLLSTM/IXLLSTE macros. This will allow large numbers of requests to be issued to system managed duplexed structures and allow system managed duplexing to be started or stopped by operator command or error injection (loss of connectivity, structure failure, etc.).

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating testing of a computer function, said method comprising:
    obtaining a testcase written to facilitate testing of a function of a first environment;
    automatically driving the testcase in a second environment to facilitate testing of a function of the second environment; and
    wherein the first environment comprises a simplex environment, and the second environment a duplexed environment.

2. The method of claim 1, wherein the automatically driving is accomplished without modifying the testcase written for the first environment.

3. The method of claim 1, further comprising providing at least one switch, wherein setting of said at least one switch defines at least one driven characteristic of the testcase in the second environment.

4. A method of facilitating testing of a computer function, said method comprising:
   obtaining a testcase written for a first environment;
   automatically driving the testcase in a second environment to facilitate testing of a function of the second environment;
   providing at least one switch, wherein setting of said at least one switch defines at least one driven characteristic of the testcase in the second environment; and
   wherein the at least one switch comprises at least one of a sync switch, async switch, duplex switch, duplex nowait switch, UDFORDER switch and NAME-CLASSMASK switch.

5. A method of facilitating testing of a computer function, said method comprising:
   obtaining a testcase written for a first environment;
   automatically driving the testcase in a second environment to facilitate testing of a function of the second environment;
   providing at least one switch, wherein setting of said at least one switch defines at least one driven characteristic of the testcase in the second environment; and
   wherein said at least one switch resides in a test tool application, and the computer function comprises a coupling facility function.

6. The method of claim 3, wherein the function comprises a coupling facility function, and wherein the at least one switch forces said automatically driving to drive different testcase processing internal to the coupling facility.

7. The method of claim 3, wherein the automatically driving is responsive to a duplex switch, and wherein the function of the second environment comprises a duplexed structure function.

8. The method of claim 3, wherein the automatically driving is responsive to a duplex NOWAIT switch, and wherein the automatically driving drives the testcase in parallel with a duplexing rebuild operation of the second environment when the duplex NOWAIT switch is set.

9. The method of claim 3, wherein the automatically driving further comprises initially filtering the testcase at parse time as unable to execute if a structure providing the function of the second environment is system managed duplexed.

10. The method of claim 3, wherein the automatically driving comprises parsing the testcase in a test tool application and providing filtering which allows the automatically driving of the testcase to proceed only if not prevented by a particular IXLCONN statement, IXLREBLD statement or CFERROR verb (causing a coupling facility structure failure) in the testcase.

11. The method of claim 1, wherein the automatically driving comprises driving different processing flows of the function to be tested in the second environment, wherein the testcase can be used to test different environments and different processing flows within an environment without modifying the testcase.

12. The method of claim 1, wherein the automatically driving the testcase comprises automatically driving a request of the testcase in the second environment to facilitate testing of the function of the second environment.

13. The method of claim 12, wherein the request comprises an IXLCONN statement, and wherein the automatically driving comprises setting an IXLCONN CFLEVEL with reference to a UDFORDER switch and a NAME-CLASSMASK switch for driving different internal processings of a coupling facility function to be tested.

14. The method of claim 1, wherein the first environment comprises sync processing, and the second environment async processing.

15. The method of claim 1, wherein the first environment comprises async processing, and the second environment sync processing.

16. A method of facilitating testing of a computer function, said method comprising:
   obtaining a testcase written for a first environment;
   automatically driving the testcase in a second environment to facilitate testing of a function of the second environment; and
   wherein the testcase written for the first environment specifies a system of the first environment upon which at least a portion of the testcase is to execute, and wherein the automatically driving comprises mapping the testcase to the second environment, the mapping comprising selecting a system of the second environment upon which the at least a portion of the testcase is to execute.

17. The method of claim 16, wherein the first environment comprises a first sysplex having multiple systems and the second environment comprises a second sysplex having multiple systems.

18. The method of claim 17, wherein the mapping comprises referencing at least one table in a test tool, the at least one table comprising a system name mapping between the first environment and the second environment.

19. The method of claim 18, wherein the test tool comprises multiple tables, each table providing system name mapping for a different system of the second sysplex.

20. The method of claim 16, wherein the automatically driving comprises automatically driving the testcase in the second environment without modifying the testcase to select said system of the second environment upon which the at least a portion of the testcase is to execute.

21. The method of claim 1, wherein the first environment comprises a function test environment, and the second environment comprises one of a system test environment and an engineering test environment.

22. A method of processing a testcase within a plurality of testing environments, said method comprising:
   allowing for indication of a testing environment within which a testcase is to execute, the environment comprising one environment of a plurality of testing environments;
   at execution time of the testcase, checking the indication of the testing environment and controlling testcase processing based upon the indication of the testing environment within which the testcase is to execute; and
   wherein the plurality of testing environments comprise at least some of a functional test environment, a system test environment, and an engineering test environment.

23. The method of claim 22, wherein the indication comprises a control statement in a control file of a test tool employing the testcase.

24. The method of claim 23, wherein the controlling comprises automatically controlling testcase processing based on the control statement, wherein a testcase written for a first testing environment of the plurality of testing environments automatically adjusts for execution in a second testing environment of the plurality of testing environments.

25. A system for facilitating testing of a computer function, said system comprising:
   means for obtaining a testcase written to facilitate testing of a function of a first environment;
   means for automatically driving the testcase in a second environment to facilitate testing of a function of the second environment; and
   wherein the first environment comprises a simplex environment, and the second environment a duplexed environment.

26. The system of claim 25, wherein the means for automatically driving comprises means for driving without modifying the testcase written for the first environment.

27. The system of claim 25, further comprising means for providing at least one switch, wherein setting of said at least one switch defines at least one driven characteristic of the testcase in the second environment.

28. A system for facilitating testing of a computer function, said system comprising:
   means for obtaining a testcase written for a first environment;
   means for automatically driving the testcase in a second environment to facilitate testing of a function of the second environment;
   means for providing at least one switch, wherein setting of said at least one switch defines at least one driven characteristic of the testcase in the second environment; and
   wherein the at least one switch comprises at least one of a sync switch, async switch, duplex switch, duplex nowait switch, UDFORDER switch and NAMECLASSMASK switch.

29. A system for facilitating testing of a computer function, said system comprising:
   means for obtaining a testcase written for a first environment;
   means for automatically driving the testcase in a second environment to facilitate testing of a function of the second environment;
   means for providing at least one switch, wherein setting of said at least one switch defines at least one driven characteristic of the testcase in the second environment; and
   wherein said at least one switch resides in a test tool application, and the computer function comprises a coupling facility function.

30. The system of claim 27, wherein the function comprises a coupling facility function, and wherein the at least one switch forces said means for automatically driving to drive different testcase processing internal to the coupling facility.

31. The system of claim 27, wherein the means for automatically driving is responsive to a duplex switch, and wherein the function of the second environment comprises a duplexed structure function.

32. The system of claim 27, wherein the means for automatically driving is responsive to a duplex NOWAIT switch, and wherein the means for automatically driving drives the testcase in parallel with a duplexing rebuild operation of the second environment when the duplex NOWAIT switch is set.

33. The system of claim 27, wherein the means for automatically driving further comprises means for initially filtering the testcase at parse time as unable to execute if a structure providing the function of the second environment is system managed duplexed.

34. The system of claim 25, wherein the means for automatically driving comprises means for parsing the testcase in a test tool application and providing filtering which allows the automatically driving of the testcase to proceed only if not prevented by a particular IXLCONN statement, IXLREBLD statement or CFERROR verb (causing a coupling facility structure failure) in the testcase.

35. The system of claim 25, wherein the means for automatically driving comprises means for driving different processing flows of the function to be tested in the second environment, wherein the testcase can be used to test different environments and different processing flows within an environment without modifying the testcase.

36. The system of claim 25, wherein the means for automatically driving the testcase comprises means for automatically driving a request of the testcase in the second environment to facilitate testing of the function of the second environment.

37. The system of claim 36, wherein the request comprises an IXLCONN statement, and wherein the means for automatically driving comprises means for setting an IXLCONN CFLEVEL with reference to a UDFORDER switch and a NAMECLASSMASK switch for driving different internal processings of a coupling facility function to be tested.

38. The system of claim 25, wherein the first environment comprises sync processing, and the second environment async processing.

39. The system of claim 25, wherein the first environment comprises async processing, and the second environment sync processing.

40. A system for facilitating testing of a computer function, said system comprising:
   means for obtaining a testcase written for a first environment;
   means for automatically driving the testcase in a second environment to facilitate testing of a function of the second environment; and
   wherein the testcase written for the first environment specifies a system of the first environment upon which at least a portion of the testcase is to execute, and wherein the means for automatically driving comprises means for mapping the testcase to the second environment, the means for mapping comprising means for selecting a system of the second environment upon which the at least a portion of the testcase is to execute.

41. The system of claim 40, wherein the first environment comprises a first sysplex having multiple systems and the second environment comprises a second sysplex having multiple systems.

42. The system of claim 41, wherein the means for mapping comprises means for referencing at least one table in a test tool, the at least one table comprising a system name mapping between the first environment and the second environment.

43. The system of claim 42, wherein the test tool comprises multiple tables, each table providing system name mapping for a different system of the second sysplex.

44. The system of claim 40, wherein the means for automatically driving comprises means for automatically driving the testcase in the second environment without modifying the testcase to select said system of the second environment upon which the at least a portion of the testcase is to execute.

45. The system of claim 25, wherein the first environment comprises a function test environment, and the second environment comprises one of a system test environment and an engineering test environment.

46. A system for facilitating testing of a computer function, said system comprising:
 a computing unit adapted to obtain a testcase written to facilitate testing of a function of a first environment;
 wherein said computing unit is further adapted to automatically drive the testcase in a second environment to facilitate testing of a function of the second environment; and
 wherein the first environment comprises a simplex environment, and the second environment a duplexed environment.

47. A system for processing a testcase within a plurality of testing environments, said system comprising:
 means for allowing for indication of a testing environment within which a testcase is to execute, the environment comprising one environment of a plurality of testing environments;
 at execution time of the testcase, means for checking the indication of the testing environment and for controlling testcase processing based upon the indication of the testing environment within which the testcase is to execute; and
 wherein the plurality of testing environments comprise at least some of a functional test environment, a system test environment, and an engineering test environment.

48. The system of claim 47, wherein the indication comprises a control statement in a control file of a test tool employing the testcase.

49. The system of claim 48, wherein the means for controlling comprises means for automatically controlling testcase processing based on the control statement, wherein a testcase written for a first testing environment of the plurality of testing environments automatically adjusts for execution in a second testing environment of the plurality of testing environments.

50. A system for processing a testcase within a plurality of testing environments, said system comprising:
 a computing unit adapted to allow for indication of a testing environment within which a testcase is to execute, the environment comprising one environment of a plurality of testing environments;
 wherein the computing unit is further adapted to check for the indication of the testing environment at execution of the testcase, and to control testcase processing based upon the indication of the testing environment within which the testcase is to execute; and
 wherein the plurality of testing environments comprise at least some of a functional test environment, a system test environment, and an engineering test environment.

51. At least one program storage device readable by a machine, tangibly embodying at least one program of instructions executable by the machine to perform a method of facilitating testing of a computer function, said method comprising:
 obtaining a testcase written to facilitate testing of a function of a first environment;
 automatically driving the testcase in a second environment to facilitate testing of a function of the second environment; and
 wherein the first environment comprises a simplex environment, and the second environment a duplexed environment.

52. The at least one program storage device of claim 51, wherein the automatically driving is accomplished without modifying the testcase written for the first environment.

53. The at least one program storage device of claim 51, further comprising providing at least one switch, wherein setting of said at least one switch defines at least one driven characteristic of the testcase in the second environment.

54. The at least one program storage device of claim 53, wherein the at least one switch comprises at least one of a sync switch, async switch, duplex switch, duplex nowait switch, UDFORDER switch and NAMECLASSMASK switch.

55. The at least one program storage device of claim 53, wherein said at least one switch resides in a test tool application, and the computer function comprises a coupling facility function.

56. The at least one program storage device of claim 53, wherein the function comprises a coupling facility function, and wherein the at least one switch forces said automatically driving to drive different testcase processing internal to the coupling facility.

57. The at least one program storage device of claim 53, wherein the automatically driving is responsive to a duplex switch, and wherein the function of the second environment comprises a duplexed structure function.

58. The at least one program storage device of claim 53, wherein the automatically driving is responsive to a duplex NOWAIT switch, and wherein the automatically driving drives the testcase in parallel with a duplexing rebuild operation of the second environment when the duplex NOWAIT switch is set.

59. The at least one program storage device of claim 53, wherein the automatically driving further comprises initially filtering the testcase at parse time as unable to execute if a structure providing the function of the second environment is system managed duplexed.

60. The at least one program storage device of claim 53, wherein the automatically driving comprises parsing the testcase in a test tool application and providing filtering which allows the automatically driving of the testcase to proceed only if not prevented by a particular IXLCONN statement, IXLREBLD statement or CFERROR verb (causing a coupling facility structure failure) in the testcase.

61. The at least one program storage device of claim 51, wherein the automatically driving comprises driving different processing flows of the function to be tested in the second environment, wherein the testcase can be used to test different environments and different processing flows within an environment without modifying the testcase.

62. The at least one program storage device of claim 51, wherein the automatically driving the testcase comprises automatically driving a request of the testcase in the second environment to facilitate testing of the function of the second environment.

63. The at least one program storage device of claim 62, wherein the request comprises an IXLCONN statement, and wherein the automatically driving comprises setting an IXLCONN CFLEVEL with reference to a UDFORDER switch and a NAMECLASSMASK switch for driving different internal processings of a coupling facility function to be tested.

64. The at least one program storage device of claim 51, wherein the first environment comprises sync processing, and the second environment async processing.

65. The at least one program storage device of claim 51, wherein the first environment comprises async processing, and the second environment sync processing.

66. The at least one program storage device of claim 51, wherein the testcase written for the first environment specifies a system of the first environment upon which at least a portion of the testcase is to execute, and wherein the automatically driving comprises mapping the testcase to the second environment, the mapping comprising selecting a system of the second environment upon which the at least a portion of the testcase is to execute.

67. The at least one program storage device of claim 66, wherein the first environment comprises a first sysplex having multiple systems and the second environment comprises a second sysplex having multiple systems.

68. The at least one program storage device of claim 67, wherein the mapping comprises referencing at least one table in a test tool, the at least one table comprising a system name mapping between the first environment and the second environment.

69. The at least one program storage device of claim 68, wherein the test tool comprises multiple tables, each table providing system name mapping for a different system of the second sysplex.

70. The at least one program storage device of claim 66, wherein the automatically driving comprises automatically driving the testcase in the second environment without modifying the testcase to select said system of the second environment upon which the at least a portion of the testcase is to execute.

71. The at least one program storage device of claim 51, wherein the first environment comprises a function test environment, and the second environment comprises one of a system test environment and an engineering test environment.

72. At least one program storage device readable by a machine, tangibly embodying at least one program of instructions executable by the machine to perform a method of processing a testcase within a plurality of testing environments, said method comprising:
   allowing for indication of a testing environment within which a testcase is to execute, the environment comprising one environment of a plurality of testing environments;
   at execution time of the testcase, checking the indication of the testing environment and controlling testcase processing based upon the indication of the testing environment within which the testcase is to execute; and
   wherein the plurality of testing environments comprise at least some of a functional test environment, a system test environment, and an engineering test environment.

73. The at least one program storage device of claim 72, wherein the indication comprises a control statement in a control file of a test tool employing the testcase.

74. The at least one program storage device of claim 73, wherein the controlling comprises automatically controlling testcase processing based on the control statement, wherein a testcase written for a first testing environment of the plurality of testing environments automatically adjusts for execution in a second testing environment of the plurality of testing environments.

\* \* \* \* \*

UNITED STATES PATENT AND TRADEMARK OFFICE
CERTIFICATE OF CORRECTION

PATENT NO. : 6,910,158 B2
DATED : June 21, 2005
INVENTOR(S) : Jones et al.

It is certified that error appears in the above-identified patent and that said Letters Patent is hereby corrected as shown below:

Column 34,
Line 1, delete the number "25" and insert -- 27 --.

Signed and Sealed this

Twenty-seventh Day of September, 2005

JON W. DUDAS
*Director of the United States Patent and Trademark Office*